(12) United States Patent
Moulin

(10) Patent No.: US 11,906,028 B2
(45) Date of Patent: Feb. 20, 2024

(54) TRACK SYSTEM WITH A SUPPORT MEMBER

(71) Applicant: Lear Corporation, Southfield, MI (US)

(72) Inventor: Antoine Moulin, Aurec-sur-Loire (FR)

(73) Assignee: Lear Corporation, Southfield, MI (US)

( * ) Notice: Subject to any disclaimer, the term of this patent is extended or adjusted under 35 U.S.C. 154(b) by 296 days.

(21) Appl. No.: 17/179,147

(22) Filed: Feb. 18, 2021

(65) Prior Publication Data
US 2021/0262560 A1 Aug. 26, 2021

Related U.S. Application Data

(60) Provisional application No. 62/979,812, filed on Feb. 21, 2020.

(51) Int. Cl.
*F16H 55/26* (2006.01)
*F16H 19/04* (2006.01)
(Continued)

(52) U.S. Cl.
CPC ........... *F16H 55/26* (2013.01); *B60N 2/0722* (2013.01); *B60N 2/08* (2013.01); *B61B 13/02* (2013.01);
(Continued)

(58) Field of Classification Search
CPC .......... F16H 55/26; F16H 19/04; F16H 55/17; F16H 57/12; F16H 2019/008; B60N 2/0722; B60N 2/08; B60N 2/0715; B60N 2002/0264; B60N 2/072; B60N 2/07; B60N 2/165; B60N 2/2213; B61B 13/02;
(Continued)

(56) References Cited

U.S. PATENT DOCUMENTS

| 1,962,789 A | 6/1934 | Simpson |
| 2,126,143 A | 8/1938 | McGregor |

(Continued)

FOREIGN PATENT DOCUMENTS

| CH | 523159 A | 5/1972 |
| CN | 1182686 A | 5/1998 |

(Continued)

OTHER PUBLICATIONS

Co-pending U.S. Appl. No. 16/711,661, filed Dec. 12, 2019.
(Continued)

*Primary Examiner* — Victor L MacArthur
(74) *Attorney, Agent, or Firm* — McGarry Bair PC

(57) ABSTRACT

A track system may include a track assembly and a support assembly. A track assembly may include a toothed portion. The support assembly may include a support member removable from and adjustably connected to the track assembly. The toothed portion may include a plurality of track teeth. The support member may include an adjuster pinion. The adjuster pinion may include a plurality of pinion teeth configured to engage the plurality of track teeth. The adjuster pinion may be adjustable to an engaged position in which the adjuster pinion and the toothed portion are engaged with one another. The adjuster pinion may be adjustable to a disengaged position in which the adjuster pinion and the toothed portion are not engaged with one another.

20 Claims, 19 Drawing Sheets

(51) Int. Cl.

| | |
|---|---|
| *F16H 55/17* | (2006.01) |
| *F16H 57/12* | (2006.01) |
| *B61B 13/02* | (2006.01) |
| *B61C 11/04* | (2006.01) |
| *H01R 13/187* | (2006.01) |
| *H01R 13/629* | (2006.01) |
| *H01R 33/02* | (2006.01) |
| *H01R 33/92* | (2006.01) |
| *H01R 33/94* | (2006.01) |
| *B61F 9/00* | (2006.01) |
| *E01B 25/04* | (2006.01) |
| *B60N 2/07* | (2006.01) |
| *B60N 2/08* | (2006.01) |
| *F16H 19/00* | (2006.01) |
| *H01R 39/64* | (2006.01) |

(52) U.S. Cl.
CPC ............... *B61C 11/04* (2013.01); *B61F 9/00* (2013.01); *E01B 25/04* (2013.01); *F16H 19/04* (2013.01); *F16H 55/17* (2013.01); *F16H 57/12* (2013.01); *H01R 13/187* (2013.01); *H01R 13/62911* (2013.01); *H01R 33/02* (2013.01); *H01R 33/92* (2013.01); *H01R 33/94* (2013.01); *B60N 2/0715* (2013.01); *F16H 2019/008* (2013.01); *H01R 39/64* (2013.01); *H01R 2201/26* (2013.01)

(58) Field of Classification Search
CPC . B61C 11/04; B61F 9/00; E01B 25/04; H01R 13/187; H01R 13/62911; H01R 33/02; H01R 33/92; H01R 33/94; H01R 39/64; H01R 2201/26; H01R 13/193; H01R 25/142; B62D 63/04
See application file for complete search history.

(56) References Cited

U.S. PATENT DOCUMENTS

| | | |
|---|---|---|
| 2,263,554 A | 11/1941 | Brach |
| 2,480,622 A | 8/1949 | Warnock |
| 2,678,082 A | 5/1954 | Nathan |
| 3,096,066 A | 7/1963 | Granet et al. |
| 3,181,102 A | 4/1965 | Fehr |
| 3,213,403 A | 10/1965 | Hermann |
| 3,268,848 A | 8/1966 | Adams |
| 3,603,918 A | 9/1971 | Woertz |
| 3,933,403 A | 1/1976 | Rubesamen et al. |
| 3,940,182 A | 2/1976 | Tamura |
| 4,020,769 A | 5/1977 | Keir |
| 4,154,422 A | 5/1979 | Muhr |
| 4,198,025 A | 4/1980 | Lowe et al. |
| 4,238,099 A | 12/1980 | Hunwicks |
| 4,243,248 A | 1/1981 | Scholz et al. |
| 4,281,871 A | 8/1981 | Grittner |
| 4,282,631 A | 8/1981 | Uehara et al. |
| 4,511,187 A | 4/1985 | Rees |
| 4,575,295 A | 3/1986 | Rebentisch |
| 4,618,808 A | 10/1986 | Ish-Shalom et al. |
| 4,707,030 A | 11/1987 | Harding |
| 4,711,589 A | 12/1987 | Goodbred |
| 4,763,360 A | 8/1988 | Daniels et al. |
| 4,776,809 A | 10/1988 | Hall |
| 4,804,229 A | 2/1989 | Nishino |
| 4,830,531 A | 5/1989 | Condit et al. |
| 4,853,555 A | 8/1989 | Wheat |
| 4,941,636 A | 7/1990 | Fujiwara et al. |
| 4,961,559 A | 10/1990 | Raymor |
| 4,969,621 A | 11/1990 | Munchow et al. |
| 4,987,316 A | 1/1991 | White et al. |
| 5,106,144 A | 4/1992 | Hayakawa et al. |
| 5,137,331 A | 8/1992 | Colozza |
| 5,167,393 A | 12/1992 | Hayakawa et al. |
| 5,192,045 A | 3/1993 | Yamada et al. |
| 5,222,814 A | 6/1993 | Boelryk |
| 5,302,065 A | 4/1994 | Vogg et al. |
| 5,322,982 A | 6/1994 | Leger et al. |
| 5,332,290 A | 7/1994 | Borlinghaus et al. |
| 5,348,373 A | 9/1994 | Stiennon |
| 5,362,241 A | 11/1994 | Matsuoka et al. |
| 5,446,442 A | 8/1995 | Swart et al. |
| 5,466,892 A | 11/1995 | Howard et al. |
| 5,489,173 A | 2/1996 | Hofle |
| 5,524,504 A | 6/1996 | Brandoli et al. |
| 5,582,381 A | 12/1996 | Graf et al. |
| 5,599,086 A | 2/1997 | Dutta |
| 5,618,192 A | 4/1997 | Drury |
| 5,655,816 A | 8/1997 | Magnuson et al. |
| 5,676,341 A | 10/1997 | Tarusawa et al. |
| 5,696,409 A | 12/1997 | Handman et al. |
| 5,701,037 A | 12/1997 | Weber et al. |
| 5,785,387 A | 7/1998 | Hernandez et al. |
| 5,796,177 A | 8/1998 | Werbelow et al. |
| 5,800,015 A | 9/1998 | Tsuchiya et al. |
| 5,893,545 A | 4/1999 | Lyons et al. |
| 5,899,532 A | 5/1999 | Paisley et al. |
| 5,918,847 A | 7/1999 | Couasnon |
| 5,921,606 A | 7/1999 | Moradell et al. |
| 5,931,436 A | 8/1999 | Rohee |
| 5,964,442 A | 10/1999 | Wingblad et al. |
| 5,964,815 A | 10/1999 | Wallace et al. |
| 6,008,547 A | 12/1999 | Dobler et al. |
| 6,036,157 A | 3/2000 | Baroin et al. |
| 6,081,044 A | 6/2000 | Anthofer et al. |
| 6,142,718 A | 11/2000 | Kroll |
| 6,150,774 A | 11/2000 | Mueller et al. |
| 6,166,451 A | 12/2000 | Pigott |
| 6,216,995 B1 | 4/2001 | Koester |
| 6,227,595 B1 | 5/2001 | Hamelin et al. |
| 6,260,813 B1 | 7/2001 | Whitcomb |
| 6,290,516 B1 | 9/2001 | Gerber |
| 6,296,498 B1 | 10/2001 | Ross |
| 6,299,230 B1 | 10/2001 | Oettl |
| 6,318,802 B1 | 11/2001 | Sjostrom et al. |
| 6,325,645 B1 | 12/2001 | Schuite |
| 6,357,814 B1 | 3/2002 | Boisset et al. |
| 6,364,272 B1 | 4/2002 | Schuler et al. |
| 6,400,259 B1 | 6/2002 | Bourcart et al. |
| 6,405,988 B1 | 6/2002 | Taylor et al. |
| 6,422,596 B1 | 7/2002 | Fendt et al. |
| 6,439,531 B1 | 8/2002 | Severini et al. |
| 6,480,144 B1 | 11/2002 | Miller et al. |
| 6,565,119 B2 | 5/2003 | Fogle, Jr. |
| 6,566,765 B1 | 5/2003 | Nitschke et al. |
| 6,588,722 B2 | 7/2003 | Eguchi et al. |
| 6,693,368 B2 | 2/2004 | Schumann et al. |
| 6,710,470 B2 | 3/2004 | Bauer et al. |
| 6,719,350 B2 | 4/2004 | Duchateau et al. |
| 6,736,458 B2 | 5/2004 | Chabanne et al. |
| 6,772,056 B2 | 8/2004 | Mattes et al. |
| 6,805,375 B2 | 10/2004 | Enders et al. |
| 6,851,708 B2 | 2/2005 | Kazmierczak |
| 6,869,057 B2 | 3/2005 | Matsumoto et al. |
| 6,882,162 B2 | 4/2005 | Schirmer et al. |
| 6,960,993 B2 | 11/2005 | Mattes et al. |
| 7,042,342 B2 | 5/2006 | Luo et al. |
| 7,083,437 B2 | 8/2006 | Mackness |
| 7,086,874 B2 | 8/2006 | Mitchell et al. |
| 7,113,541 B1 | 9/2006 | Lys et al. |
| 7,156,463 B2 | 1/2007 | Taubmann et al. |
| 7,159,899 B2 | 1/2007 | Nitschke et al. |
| 7,170,192 B2 | 1/2007 | Kazmierczak |
| 7,188,805 B2 | 3/2007 | Henley et al. |
| 7,207,541 B2 | 4/2007 | Frohnhaus et al. |
| 7,271,501 B2 | 9/2007 | Dukart et al. |
| 7,288,009 B2 | 10/2007 | Lawrence et al. |
| 7,293,831 B2 | 11/2007 | Greene |
| 7,300,091 B2 | 11/2007 | Nihonmatsu et al. |
| 7,322,605 B2 | 1/2008 | Ventura et al. |
| 7,348,687 B2 | 3/2008 | Aichriedler et al. |
| 7,363,194 B2 | 4/2008 | Schlick et al. |
| 7,370,831 B2 | 5/2008 | Laib et al. |

(56) References Cited

U.S. PATENT DOCUMENTS

| | | |
|---|---|---|
| 7,388,466 B2 | 6/2008 | Ghabra et al. |
| 7,389,960 B2 | 6/2008 | Mitchell et al. |
| 7,416,042 B2 | 8/2008 | Czaykowska et al. |
| 7,434,883 B2 | 10/2008 | Deptolla |
| 7,454,170 B2 | 11/2008 | Goossens et al. |
| 7,455,535 B2 | 11/2008 | Insalaco et al. |
| 7,503,522 B2 | 3/2009 | Henley et al. |
| 7,505,754 B2 | 3/2009 | Kazmierczak et al. |
| 7,523,913 B2 | 4/2009 | Mizuno et al. |
| 7,556,233 B2 | 7/2009 | Gryp et al. |
| 7,560,827 B2 | 7/2009 | Jacas-Miret et al. |
| 7,633,301 B2 | 12/2009 | Steenwyk et al. |
| 7,661,637 B2 | 2/2010 | Mejuhas et al. |
| 7,665,939 B1 | 2/2010 | Cardona |
| 7,739,820 B2 | 6/2010 | Frank |
| 7,744,386 B1 | 6/2010 | Speidel et al. |
| 7,980,525 B2 | 7/2011 | Kostin |
| 7,980,798 B1 | 7/2011 | Kuehn et al. |
| 8,010,255 B2 | 8/2011 | Darraba |
| 8,146,991 B2 | 4/2012 | Stanz et al. |
| 8,278,840 B2 | 10/2012 | Logiudice et al. |
| 8,282,326 B2 | 10/2012 | Krostue et al. |
| 8,376,675 B2 | 2/2013 | Schulze et al. |
| 8,408,631 B2 | 4/2013 | Sandmann et al. |
| 8,463,501 B2 | 6/2013 | Jousse |
| 8,536,928 B1 | 9/2013 | Gagne et al. |
| 8,648,613 B2 | 2/2014 | Ewerhart et al. |
| 8,702,170 B2 | 4/2014 | Abraham et al. |
| 8,757,578 B2 | 6/2014 | Kitamura et al. |
| 8,757,720 B2 | 6/2014 | Hurst, III et al. |
| 8,800,949 B2 | 8/2014 | Schebaum et al. |
| 8,857,778 B2 | 10/2014 | Nonomiya |
| 8,936,526 B2 | 1/2015 | Boutouil et al. |
| 8,967,719 B2 | 3/2015 | Ngiau et al. |
| RE45,456 E | 4/2015 | Sinclair et al. |
| 9,010,712 B2 | 4/2015 | Gray et al. |
| 9,018,869 B2 | 4/2015 | Yuasa et al. |
| 9,045,061 B2 | 6/2015 | Kostin et al. |
| 9,162,590 B2 | 10/2015 | Nagura et al. |
| 9,174,604 B2 | 11/2015 | Wellhoefer et al. |
| 9,242,580 B2 | 1/2016 | Schebaum et al. |
| 9,318,922 B2 | 4/2016 | Hall et al. |
| 9,340,125 B2 | 5/2016 | Stutika et al. |
| 9,346,428 B2 | 5/2016 | Bortolin |
| 9,399,412 B2 | 7/2016 | Kanai |
| 9,422,058 B2 | 8/2016 | Fischer et al. |
| 9,561,770 B2 | 2/2017 | Sievers et al. |
| 9,608,392 B1 | 3/2017 | Destro |
| 9,610,862 B2 | 4/2017 | Bonk et al. |
| 9,663,232 B1 | 5/2017 | Porter et al. |
| 9,673,583 B2 | 6/2017 | Hudson et al. |
| 9,701,217 B2 | 7/2017 | Eckenroth et al. |
| 9,731,628 B1 | 8/2017 | Rao et al. |
| 9,758,061 B2 | 9/2017 | Pluta et al. |
| 9,789,834 B2 | 10/2017 | Rapp et al. |
| 9,796,304 B2 | 10/2017 | Salter et al. |
| 9,815,425 B2 | 11/2017 | Rao et al. |
| 9,821,681 B2 | 11/2017 | Rao et al. |
| 9,840,220 B2 | 12/2017 | Van Buskirk et al. |
| 9,879,458 B2 | 1/2018 | Gabriel et al. |
| 9,919,624 B2 | 3/2018 | Cziomer et al. |
| 9,950,682 B1 | 4/2018 | Gramenos et al. |
| 10,059,229 B2 | 8/2018 | Kume et al. |
| 10,059,232 B2 | 8/2018 | Frye et al. |
| 10,160,351 B2 | 12/2018 | Sugimoto et al. |
| 10,220,731 B2 | 3/2019 | Kume |
| 10,479,227 B2 | 11/2019 | Nolte et al. |
| 10,486,554 B2 | 11/2019 | Napau |
| 10,493,243 B1 | 12/2019 | Braham |
| 10,547,135 B2 | 1/2020 | Sugiura |
| 10,549,659 B2 | 2/2020 | Sullivan et al. |
| 10,583,752 B2 | 3/2020 | Higuchi |
| 10,654,378 B2 | 5/2020 | Pons |
| 2002/0056798 A1 | 5/2002 | Eguchi |
| 2005/0046367 A1 | 3/2005 | Wevers et al. |
| 2005/0089367 A1 | 4/2005 | Sempliner |
| 2005/0150705 A1 | 7/2005 | Vincent et al. |
| 2005/0211835 A1 | 9/2005 | Henley et al. |
| 2005/0215098 A1 | 9/2005 | Muramatsu et al. |
| 2005/0230543 A1 | 10/2005 | Laib et al. |
| 2005/0236899 A1 | 10/2005 | Kazmierczak |
| 2005/0258676 A1 | 11/2005 | Mitchell et al. |
| 2006/0131470 A1 | 6/2006 | Yamada et al. |
| 2006/0208549 A1 | 9/2006 | Hancock et al. |
| 2006/0220411 A1 | 10/2006 | Pathak et al. |
| 2008/0021602 A1 | 1/2008 | Kingham et al. |
| 2008/0084085 A1 | 4/2008 | Mizuno et al. |
| 2008/0090432 A1 | 4/2008 | Patterson et al. |
| 2009/0014584 A1 | 1/2009 | Rudduck et al. |
| 2009/0129105 A1 | 5/2009 | Kusu et al. |
| 2009/0251920 A1 | 10/2009 | Kino et al. |
| 2009/0302665 A1 | 12/2009 | Dowty |
| 2009/0319212 A1 | 12/2009 | Cech et al. |
| 2010/0117275 A1 | 5/2010 | Nakamura |
| 2011/0024595 A1 | 2/2011 | Oi et al. |
| 2011/0225773 A1 | 9/2011 | Hearn et al. |
| 2012/0001049 A1 | 1/2012 | Selbold |
| 2012/0112032 A1 | 5/2012 | Kohen |
| 2013/0020459 A1 | 1/2013 | Moriyama et al. |
| 2013/0035994 A1 | 2/2013 | Pattan et al. |
| 2013/0153735 A1 | 6/2013 | Ruthman et al. |
| 2013/0334390 A1 | 12/2013 | Schebaum |
| 2013/0341479 A1 | 12/2013 | Yamada et al. |
| 2014/0110554 A1 | 4/2014 | Oya et al. |
| 2014/0224954 A1 | 8/2014 | Oh et al. |
| 2014/0263920 A1 | 9/2014 | Anticuar et al. |
| 2014/0265479 A1 | 9/2014 | Bennett |
| 2014/0291473 A1 | 10/2014 | Mischer |
| 2015/0048206 A1 | 2/2015 | Deloubes |
| 2015/0052819 A1 | 2/2015 | Lee |
| 2015/0069807 A1 | 3/2015 | Kienke |
| 2015/0083882 A1 | 3/2015 | Stutika et al. |
| 2015/0191106 A1 | 7/2015 | Inoue et al. |
| 2015/0236462 A1 | 8/2015 | Davidson, Jr. et al. |
| 2015/0298580 A1 | 10/2015 | Kanai |
| 2016/0039314 A1 | 2/2016 | Anticuar et al. |
| 2016/0154170 A1 | 6/2016 | Thompson et al. |
| 2016/0181708 A1 | 6/2016 | Busse |
| 2016/0236613 A1 | 8/2016 | Trier |
| 2017/0080825 A1 | 3/2017 | Bonk et al. |
| 2017/0080826 A1 | 3/2017 | Bonk et al. |
| 2017/0166091 A1 | 6/2017 | Cziomer |
| 2017/0166093 A1 | 6/2017 | Cziomer et al. |
| 2017/0261343 A1 | 9/2017 | Lanter et al. |
| 2017/0291507 A1 | 10/2017 | Hattori et al. |
| 2018/0017189 A1 | 1/2018 | Wegner |
| 2018/0039917 A1 | 2/2018 | Buttolo et al. |
| 2018/0058122 A1 | 3/2018 | Lang |
| 2018/0072188 A1 | 3/2018 | Yamada |
| 2018/0086230 A1 | 3/2018 | Kume et al. |
| 2018/0086232 A1 | 3/2018 | Kume |
| 2018/0105072 A1 | 4/2018 | Pons |
| 2018/0126875 A1 | 5/2018 | Kume et al. |
| 2018/0148011 A1 | 5/2018 | Zaugg et al. |
| 2018/0154799 A1 | 6/2018 | Lota |
| 2018/0183623 A1 | 6/2018 | Schoenfeld et al. |
| 2018/0244175 A1 | 8/2018 | Tan |
| 2018/0275648 A1 | 9/2018 | Ramalingam |
| 2019/0001846 A1 | 1/2019 | Jackson et al. |
| 2019/0084453 A1* | 3/2019 | Petit .................. B60N 2/0818 |
| 2019/0126786 A1 | 5/2019 | Dry et al. |
| 2019/0337413 A1 | 11/2019 | Romer |
| 2019/0337414 A1 | 11/2019 | Condamin et al. |
| 2019/0337415 A1 | 11/2019 | Condamin et al. |
| 2019/0337416 A1 | 11/2019 | Condamin et al. |
| 2019/0337417 A1 | 11/2019 | Condamin et al. |
| 2019/0337418 A1 | 11/2019 | Condamin et al. |
| 2019/0337419 A1 | 11/2019 | Condamin et al. |
| 2019/0337420 A1 | 11/2019 | Condamin et al. |
| 2019/0337421 A1 | 11/2019 | Condamin et al. |
| 2019/0337422 A1 | 11/2019 | Condamin et al. |
| 2019/0337471 A1 | 11/2019 | Brehm |
| 2019/0379187 A1 | 12/2019 | Christensen et al. |
| 2019/0389336 A1 | 12/2019 | Malinowski et al. |

(56) References Cited

U.S. PATENT DOCUMENTS

| | | |
|---|---|---|
| 2020/0009995 A1 | 1/2020 | Sonar |
| 2020/0010001 A1 | 1/2020 | Pinkelman et al. |
| 2020/0047641 A1 | 2/2020 | D'Eramo et al. |
| 2020/0055423 A1 | 2/2020 | Prozzi et al. |
| 2020/0079244 A1 | 3/2020 | Carbone et al. |
| 2020/0180516 A1 | 6/2020 | Moulin |
| 2020/0180517 A1 | 6/2020 | Moulin |
| 2020/0189504 A1 | 6/2020 | Ricart et al. |
| 2020/0189511 A1 | 6/2020 | Ricart et al. |
| 2020/0194936 A1 | 6/2020 | Ricart et al. |
| 2020/0194948 A1 | 6/2020 | Lammers et al. |
| 2020/0207241 A1 | 7/2020 | Moulin et al. |
| 2020/0247275 A1 | 8/2020 | Yetukuri et al. |
| 2020/0262367 A1 | 8/2020 | Banares et al. |
| 2020/0269754 A1 | 8/2020 | Ricart et al. |
| 2020/0282871 A1 | 9/2020 | Ricart et al. |
| 2020/0282880 A1 | 9/2020 | Jones et al. |
| 2021/0101562 A1 | 4/2021 | Ricart et al. |
| 2021/0105011 A1 | 4/2021 | Ricart et al. |
| 2021/0105012 A1 | 4/2021 | Ricart et al. |
| 2021/0107419 A1 | 4/2021 | Ricart et al. |
| 2021/0129710 A1 | 5/2021 | Petit et al. |
| 2021/0129778 A1 | 5/2021 | Banares et al. |

FOREIGN PATENT DOCUMENTS

| | | |
|---|---|---|
| CN | 201272262 Y | 7/2009 |
| CN | 203190203 U | 9/2013 |
| CN | 103380024 A | 10/2013 |
| CN | 203799201 U | 8/2014 |
| CN | 104071039 A | 10/2014 |
| CN | 104487282 A | 4/2015 |
| CN | 104648190 A | 5/2015 |
| CN | 206287857 U | 6/2017 |
| CN | 106965712 A | 7/2017 |
| CN | 106994917 A | 8/2017 |
| CN | 107614316 A | 1/2018 |
| CN | 107867204 A | 1/2018 |
| CN | 107706680 A | 2/2018 |
| CN | 107804196 A | 3/2018 |
| CN | 107867205 A | 4/2018 |
| CN | 109070771 A | 12/2018 |
| CN | 208640054 U | 3/2019 |
| CN | 109878384 A | 6/2019 |
| CN | 110435487 A | 11/2019 |
| CN | 110435493 A | 11/2019 |
| CN | 110435494 A | 11/2019 |
| CN | 209599576 U | 11/2019 |
| DE | 2004504 A1 | 8/1971 |
| DE | 19509344 A1 | 9/1996 |
| DE | 19602250 A1 | 7/1997 |
| DE | 10143721 A1 | 3/2003 |
| DE | 60100054 T2 | 7/2003 |
| DE | 202005013714 U1 | 12/2005 |
| DE | 102005007430 A1 | 3/2006 |
| DE | 102006022032 A1 | 12/2006 |
| DE | 102009059126 A1 | 7/2010 |
| DE | 102010017038 A1 | 2/2011 |
| DE | 102011002656 A1 | 9/2011 |
| DE | 102011056278 A1 | 2/2013 |
| DE | 202014102336 U1 | 6/2014 |
| DE | 102013109653 A1 | 3/2015 |
| DE | 102015212100 A1 | 12/2015 |
| DE | 102016113409 A1 | 4/2017 |
| DE | 102015221077 A1 | 5/2017 |
| DE | 102017210396 A1 | 12/2017 |
| DE | 102019206304 A1 | 11/2019 |
| DE | 102019206411 A1 | 11/2019 |
| DE | 102020128572 A1 | 5/2021 |
| DE | 102019135631 A1 | 6/2021 |
| EP | 0074754 A2 | 3/1983 |
| EP | 0090235 A2 | 10/1983 |
| EP | 0783990 A1 | 7/1997 |
| EP | 1176047 A1 | 1/2002 |
| EP | 2298609 B1 | 3/2011 |
| EP | 3150426 A1 | 4/2017 |
| EP | 3456579 A1 | 3/2019 |
| FR | 2762814 A1 | 11/1998 |
| FR | 2951329 A1 | 4/2011 |
| FR | 2986751 A1 | 8/2013 |
| JP | 2001500307 A | 1/2001 |
| JP | 3314591 B2 | 8/2002 |
| JP | 2003227703 A | 8/2003 |
| JP | 2004103346 A | 4/2004 |
| JP | 2005119518 A | 5/2005 |
| JP | 2007112174 A | 5/2007 |
| JP | 2008158578 A | 7/2008 |
| JP | 4222262 B2 | 2/2009 |
| JP | 2009200023 A | 9/2009 |
| JP | 2009202813 A | 9/2009 |
| JP | 2013230721 A | 11/2013 |
| JP | 2019098789 A | 6/2019 |
| JP | 2020023292 A | 2/2020 |
| KR | 20100044775 A | 4/2010 |
| WO | 01/87665 A1 | 11/2001 |
| WO | 2003002256 A2 | 1/2003 |
| WO | 2005/068247 A2 | 7/2005 |

OTHER PUBLICATIONS

Co-pending U.S. Appl. No. 17/078,706, filed Oct. 23, 2020.
Co-pending U.S. Appl. No. 17/116,959, filed Dec. 9, 2020.
Co-pending U.S. Appl. No. 17/179,159, filed Feb. 18, 2021.
Co-pending U.S. Appl. No. 17/179,166, filed Feb. 18, 2021.
Co-pending U.S. Appl. No. 17/179,170, filed Feb. 18, 2021.
Co-pending U.S. Appl. No. 17/179,176, filed Feb. 18, 2021.
Co-pending U.S. Appl. No. 17/179,144, filed Feb. 18, 2021.
German Office Action dated Sep. 23, 2021 related to corresponding German Patent Application No. 10 2021 104 018.3.

* cited by examiner

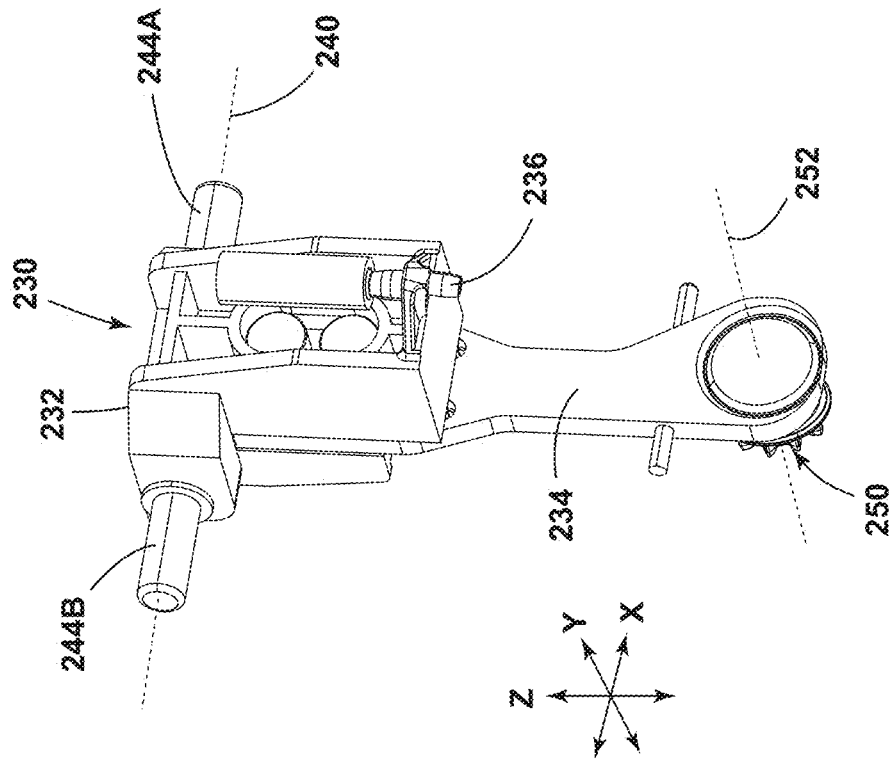
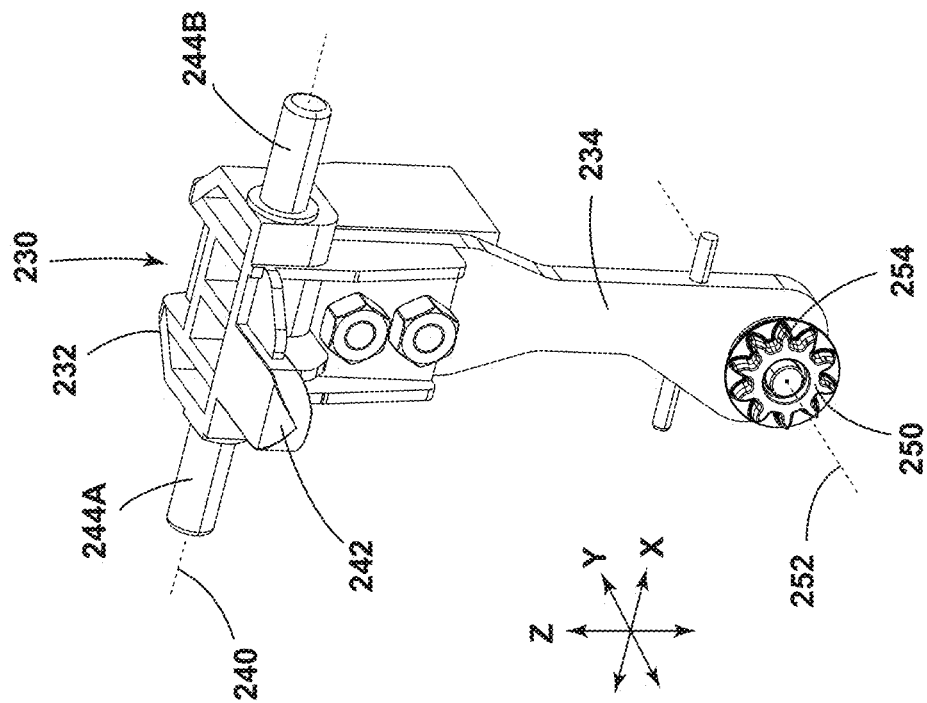
FIG. 4B
FIG. 4A

TRACK SYSTEM WITH A SUPPORT MEMBER

CROSS-REFERENCE TO RELATED APPLICATION

This application claims the benefit of U.S. Provisional Patent Application Ser. No. 62/979,812, filed on Feb. 21, 2020, the disclosure of which is hereby incorporated by reference in its entirety as though fully set forth herein.

TECHNICAL FIELD

The present disclosure generally relates to a track/rail system and/or support members configured for connection with, movement along and relative to, and removal from tracks/rails, including support members and tracks/rails that may, for example, be utilized in connection with vehicle seats.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some track systems may have support members that may not provide sufficient functionality, may be complex to operate and/or assemble, and/or may not operate efficiently. For example, some support members may not effectively and/or efficiently engage a track of a track assembly.

There is a desire for solutions/options that minimize or eliminate one or more challenges or shortcomings of track systems. The foregoing discussion is intended only to illustrate examples of the present field and is not a disavowal of scope.

SUMMARY

In embodiments, a track system may include a track assembly and a support assembly. A track assembly may include a toothed portion. The support assembly may include a support member removable from and adjustably connected to the track assembly. The toothed portion may include a plurality of track teeth. The support member may include an adjuster pinion. The adjuster pinion may include a plurality of pinion teeth configured to engage the plurality of track teeth. The adjuster pinion may be adjustable to an engaged position in which the adjuster pinion and the toothed portion are engaged with one another. The adjuster pinion may be adjustable to a disengaged position in which the adjuster pinion and the toothed portion are not engaged with one another.

In embodiments, a method of operating the track system may include connecting the support member and the track assembly in a Z-direction, adjusting the adjuster pinion from the disengaged position to the engaged position, and adjusting a longitudinal position of the support member relative to the track assembly via the adjuster pinion.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

FIGS. 4A and 4B are perspective views generally illustrating an embodiment of an adjuster assembly according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1A:
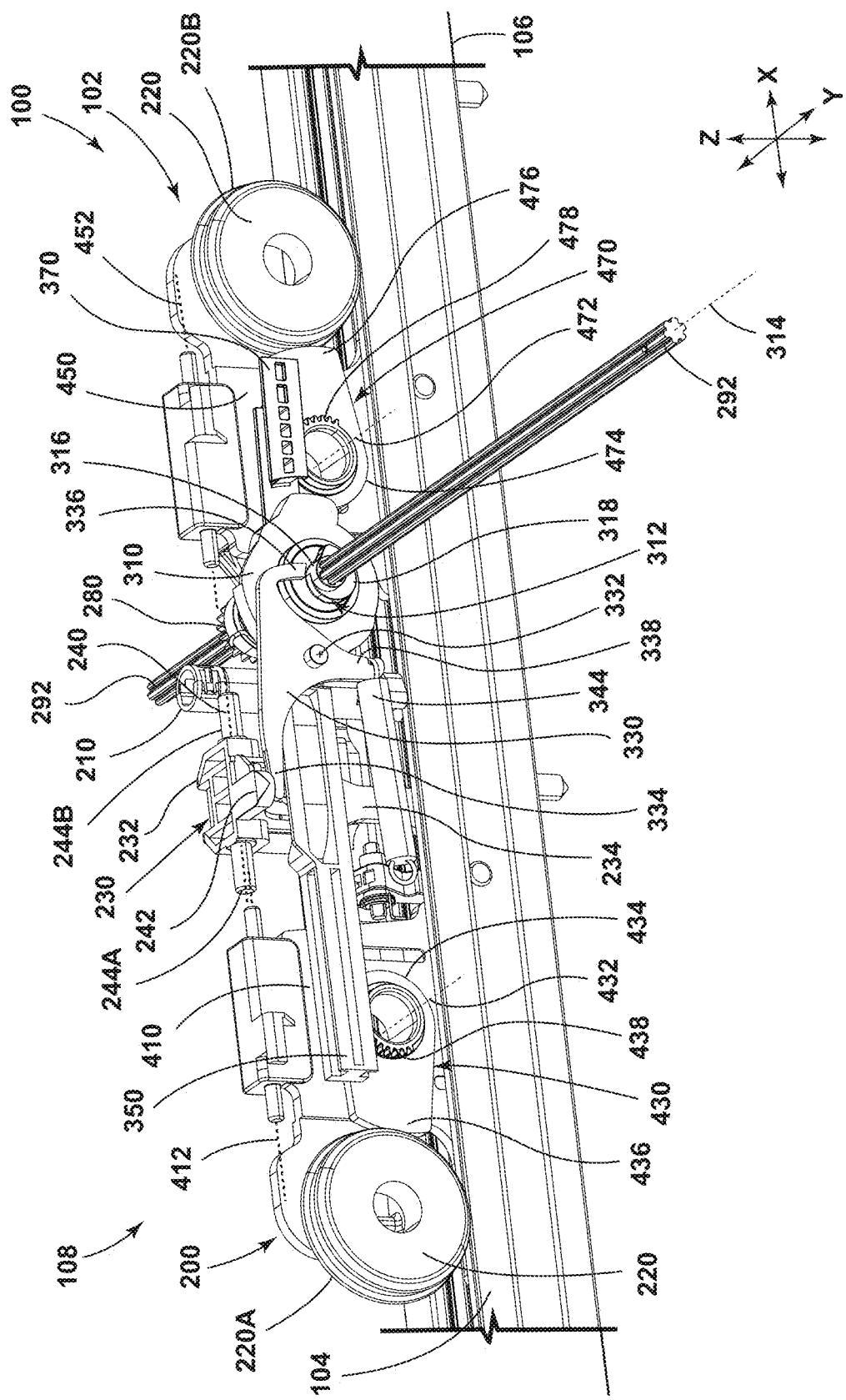
FIGS. 1A and 1B are perspective views generally illustrating an embodiment of a track system according to teachings of the present disclosure.
Figure 1B:
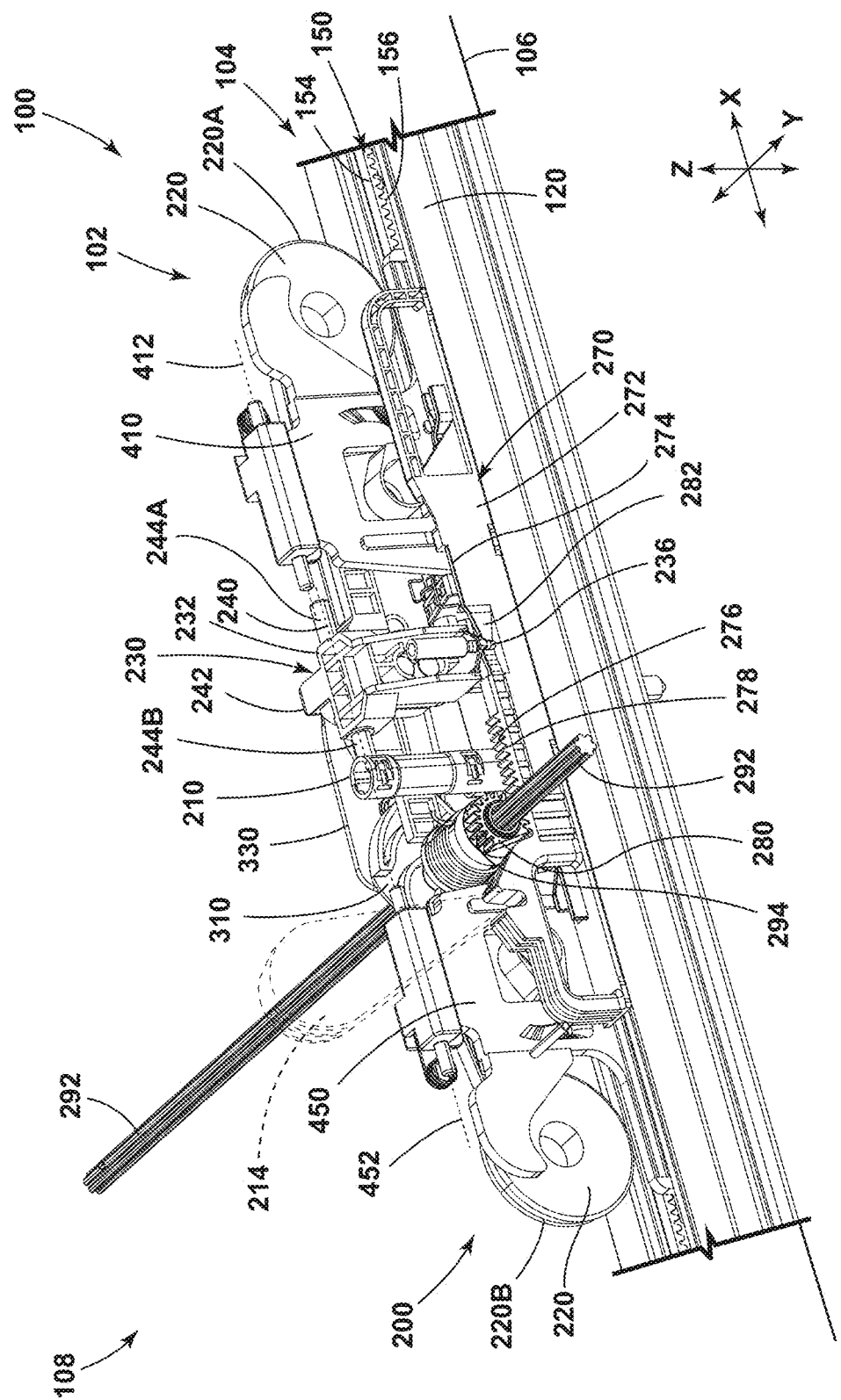

In embodiments, such as generally illustrated in FIGS. 1A and 1B, a track system 100 may include a support assembly 102 and/or one or more track/rail assemblies 104. A support assembly 102 and/or a track assembly 104 may include and/or be connected to an electrical system (e.g., of a vehicle 108), which may include a controller and/or a power source.

In embodiments, such as generally illustrated in FIGS. 1A and 1B, a track assembly 104 may be connected to and/or disposed in a mounting surface 106 (e.g., a floor of a vehicle 108) and may facilitate selective connection of one or more support assemblies 102 to the mounting surface 106. A track assembly 104 may facilitate adjustment of one or more support assemblies 102, such as relative to the mounting surface 106 and/or within a vehicle 108. In examples, a track system 100 may include several track assemblies 104 that may be configured to engage a corresponding portion of a support assembly 102. Several track assemblies 104 may be connected to a portion of the mounting surface 106 (e.g., a floor, wall, ceiling, etc.), may extend parallel to one another, and/or may be offset from each other in a lateral/transverse direction (e.g., a Y-direction) such that the track assemblies 104 may be generally aligned with respective outer sides of a support assembly 102.

Figure 2:
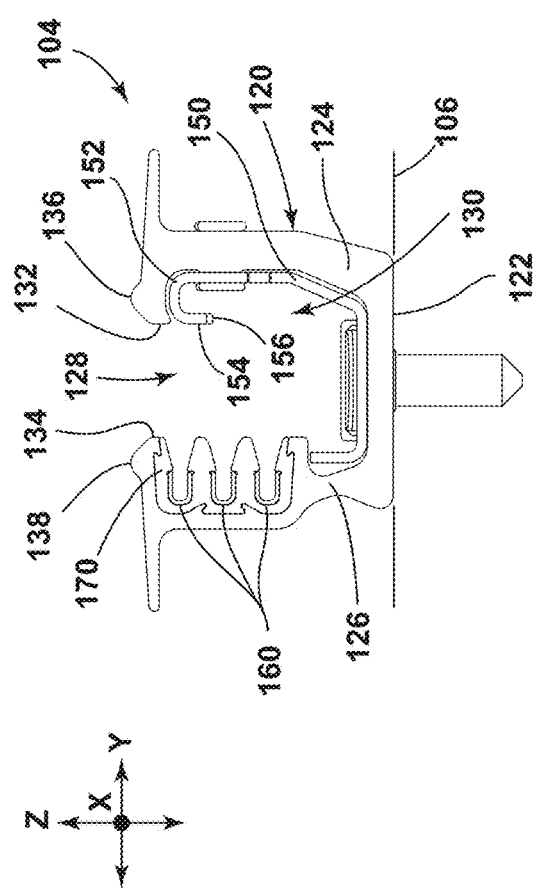
FIG. 2 is an end view generally illustrating an embodiment of a track assembly according to teachings of the present disclosure.

With embodiments, such as generally illustrated in FIGS. 1A-2, a track assembly 104 may include an outer track 120 and/or an inner track 150. An outer track 120 and/or an inner track 150 may be an elongated member extending generally in an X-direction (e.g., a longitudinal direction). An outer track 120 and/or an inner track 150 may facilitate movement and/or adjustment of a support assembly 102 and/or a support member 200 along a track assembly 104. For example and without limitation, a support member 200 may roll along a top surface of an outer track 120 via one or more rolling members 220, and/or a support member 200 may selectively engage the outer track 120 and/or the inner track 150 to selectively restrict/control relative movement between a support assembly 102 and a track assembly 104. An outer track 120 and/or an inner track 150 may include one or more of a variety of materials. For example and without limitation, the outer track 120 may include a first material (e.g., aluminum) that may be relatively light, and/or the inner track 150 may include a second material (e.g., steel) that may be relatively strong compared to the first material.

With embodiments, such as generally illustrated in FIG. 2, an outer track 120 may have a track base portion 122 and two track wall portions (e.g., a first track wall portion 124 and a second track wall portion 126) protruding from the track base portion 122 to form a generally U-shaped cross-section in a Y-Z plane (e.g., in a plane perpendicular to an X-direction). The U-shaped cross section may define a track receptacle 130 configured to receive and/or at least temporarily retain a portion of a support assembly 102. A first track lip/wing 132 and a second track lip/wing 134 may project inwardly toward one another from the first track wall portion 124 and the second track wall portion 126, respectively. A track opening 128 may be defined between the two track lips 132, 134. A portion of a support assembly 102 may be inserted into the track opening 128 and selectively retained within the track receptacle 130. An outer track 120 may include a first rolling portion 136 and/or a second rolling portion 138, which may be configured to engage one or more rolling members 220 of a support member 200. A first rolling portion 136 may be disposed on and/or adjacent to a first track lip 132 (e.g., at or about a top surface of the outer track 120). A second rolling portion 138 may be disposed on and/or adjacent to a second track lip 134. A first rolling portion 136 and/or the second rolling portion 138 may be configured as a ridge, for example, protruding from a track assembly 104 in a Z-direction and/or may extend substantially in an X-direction along some or all of a length of the outer track 120.

Figure 3:
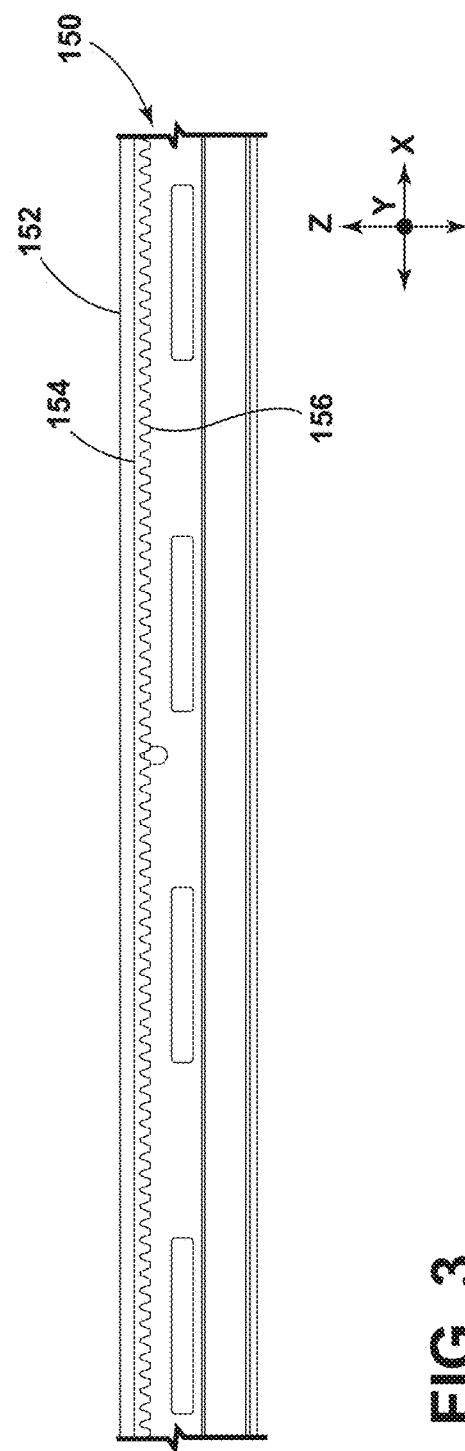
FIG. 3 is a cross-sectional view generally illustrating an embodiment of an inner track according to teachings of the present disclosure.
Figure 5:
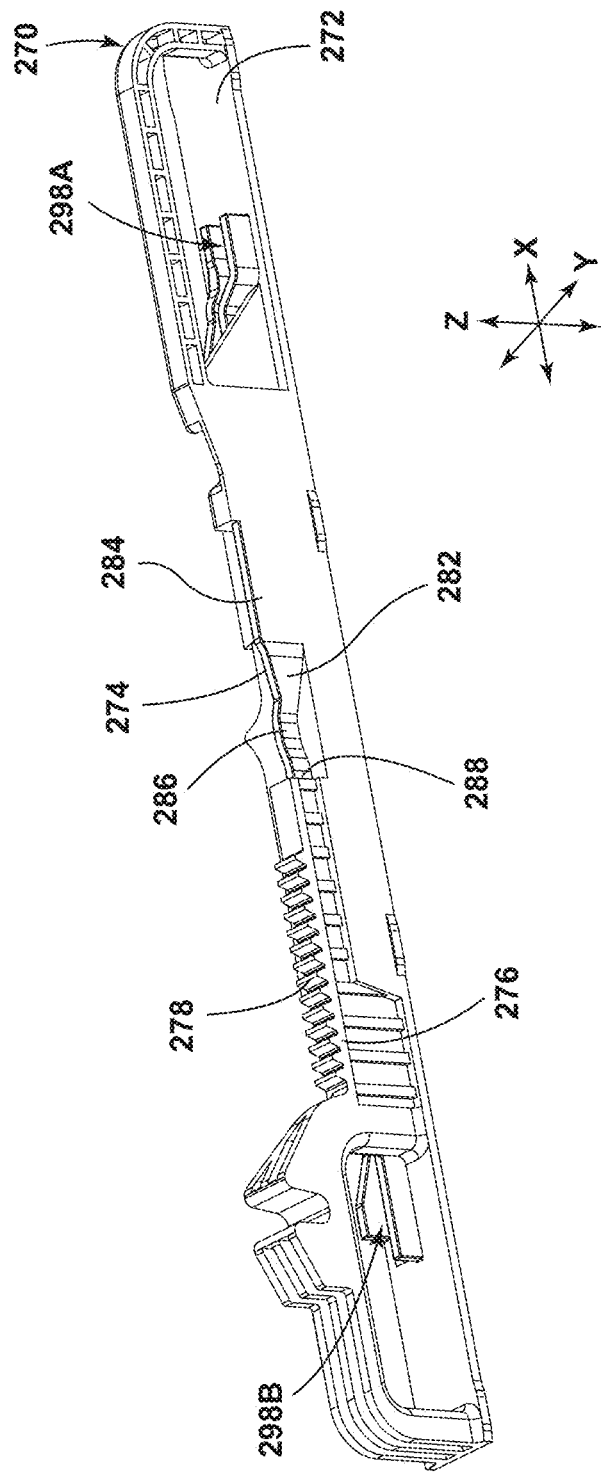
FIG. 5 is a perspective view generally illustrating an embodiment of a slider according to teachings of the present disclosure.

With embodiments, such as generally illustrated in FIGS. 2 and 3, an inner track 150 may be disposed partially and/or completely within a track receptacle 130. An inner track 150 may be disposed on and/or connected (e.g., fixed) to a track base portion 122 and/or one or more track wall portions 124, 126 of an outer track 120. An inner track 150 may, for example, include a generally L-shaped cross section. An inner track 150 may include a hook portion 152, which may be disposed adjacent to and/or extend adjacent to a first track wall portion 124 and/or a first track lip 132.

With embodiments, such as generally illustrated in FIGS. 2 and 3, a track assembly 104 may include one or more toothed portions 154 (e.g., gear racks) configured to engage an adjuster pinion 250 of an adjuster assembly 230. A toothed portion 154 may include one or more track teeth 156. A toothed portion 154 may generally extend in an X-direction, such as along all or a portion of a length of the inner track 150. One or more (e.g., all) of the track teeth 156 may be disposed one after another and/or aligned with one another in an X-direction. Track teeth 156 may extend and/or protrude from the toothed portion 154 generally in a Z-direction (e.g., downward in the Z-direction toward the mounting surface 106). A toothed portion 154 may be disposed within a track receptacle 130 and/or may be disposed on an underside of a track assembly 104. A toothed portion 154 may be connected to and/or formed as a portion of an outer track 120 and/or an inner track 150. For example and without limitation, a toothed portion 154 may be connected to and/or integrally formed with an inner track 150, such as at or about a distal end of a hook portion 152. A toothed portion 154 and/or track teeth 156 may be disposed adjacent to and/or substantially aligned/overlapping (e.g., in a Z-direction) with an edge of a first track lip 132 that at least partially defines a track opening 128.

In embodiments, such as generally illustrated in FIG. 2, a track assembly 104 may include one or more electrical conductors 160 (e.g., bus bars) configured to selectively contact and/or engage (e.g., electrically connect with) one or more contacts 212 of a support assembly 102. With examples, a conductor 160 may be an elongated member extending in the X-direction and/or may have a generally U-shaped cross section that opens in a Y-direction. A conductor 160 may be operatively connected to a controller and/or a power source. A conductor 160 may be connected to a first track wall portion 124 and/or a second track wall portion 126 of an outer track 120, and/or another portion of a track assembly 104. A conductor 160 may be connected to a track assembly 104 via an insulator 170, which may be configured to electrically insulate/isolate a conductor 160 from other portions of a track assembly 104. An insulator 170 may be an elongated body, which may extend in an X-direction, and/or may be configured to receive and/or retain one or more conductors 160.

With embodiments, such as generally illustrated in FIGS. 1A, 1B, 6, 7, and 10A-11, a support assembly 102 may include a support member 200. A support assembly 102 and/or a support member 200 may be adjusted and/or moved along a track assembly 104 (e.g., in an X-direction) manually and/or via an adjuster assembly 230. A support member 200 may be configured for connection with and removal (e.g., in a Z-direction) from a track assembly 104, such as in a plurality of locations along the track assembly 104. A support member 200 may, for example and without limitation, include, be connected to, and/or support a seat, such as a vehicle seat, and/or one or more other components (e.g., consoles, cargo, cargo racks, etc.). The support assembly 102, the support member 200, and/or one or more components connected thereto may include one or more electrical components (e.g., controllers, power sources, seat heaters, airbags, air bladders, fans, etc.). A support member 200 may be configured as a base, a leg, and/or a support structure, for example.

With embodiments, such as generally illustrated in FIGS. 1A, 1B, 6, 7, and 10A-11, a support member 200 may include one or more electrical connectors 210 that may be configured for selective connection with a track assembly 104. An electrical connector 210 may be configured to selectively electrically connect with a track assembly 104, such as with a conductor 160 (e.g., a bus bar) of the track assembly 104. For example, one or more contacts 212 of the electrical connector 210 may rotate into and out of contact with one or more conductors 160. Electrical connection between an electrical connector 210 and a conductor 160 may permit electrical power and/or one or more signals (e.g., control signals, sensor data signals, etc.) to be provided to and/or received from the support member 200 (e.g., an electrical component).

With embodiments, such as generally illustrated in FIGS. 1A, 1B, 6, 7, and 10A-11, a support member 200 may include one or more rolling members 220. A rolling member 220 may be configured to engage and/or roll along a first rolling portion 136 and/or a second rolling portion 138 of a track assembly 104. A support member 200 may be configured to move along a track assembly 104, at least in part, via one or more rolling members 220 (e.g., rolling members 220A, 220B). In embodiments, a rolling member 220 may be configured to support at least a portion of the support assembly 102. A rolling member 220 may rotate as the support assembly 102 moves along the track assembly 104. A rolling member 220 may be rotatably connected to a body of the support member 200. For example and without limitation, a first rolling member 220A may be rotatably connected at or about a first end of a support member 200, and/or a second rolling member 220B may be rotatably connected at or about a second end of the support member 200. One or more rolling members 220 (e.g., first and second rolling members 220A, 220B) may be connected to the same lateral side of a support member 200. In such embodiments, a first and second rolling member 220A, 220B may both engage and/or roll along the same rolling portion (e.g., a first rolling portion 136, a second rolling portion 138, etc.). Additionally and/or alternatively, rolling members 220 may be rotatably connected on opposite sides of an adjuster assembly 230 relative to a Y-direction, such that a rolling member 220 may roll along a first rolling portion 136 another rolling member 220 may roll along a second rolling portion 138.

With embodiments, such as generally illustrated in FIGS. 1A, 1B, and/or 6-11, a support member 200 may include an adjuster assembly 230 configured to facilitate adjustment of the position (e.g., in an X-direction) of a support member 200 relative to a track assembly 104. For example and without limitation, an electric motor 238 of the adjuster assembly 230 may rotate an adjuster pinion 250, which may engage the toothed portion 154 to adjust the position of the support member 200 relative to the track assembly 104, such as in an X-direction. An adjuster assembly 230 may be adjustably connected to a body of the support member 200 such that the adjuster assembly 230 may move and/or float relative to the body of the support member 200, such as in a Z-direction. Additionally and/or alternatively, an adjuster assembly 230 may be rotatable relative to the support member 200 and/or the track assembly 104, such as about an adjuster axis 240. An adjuster assembly 230 may be operatively connected to an electrical component of a support member 200, such as via one or more wires. For example and without limitation, an electrical component may provide power to and/or control operation of the electric motor 238.

With embodiments, such as generally illustrated in FIGS. 4A and 4B, an adjuster assembly 230 may include an adjuster body 232 and/or an adjuster member 234. An adjuster member 234 may generally extend from an adjuster body 232 in a Z-direction (e.g., downward in a Z-direction toward a mounting surface 106). An electrical motor 238 (see, e.g., FIG. 7) may be disposed at least partially in the adjuster body 232 and/or in the adjuster member 234. Additionally or alternatively, an electrical motor 238 may be disposed within a support assembly 102 and/or may be operatively connected to one or more support members 200. For example and without limitation, a support assembly 102 may include (i) two or more support members 200 disposed opposite one another (e.g., relative to a Y-direction) and/or (ii) an electrical motor 238 disposed between the two support members 200 and connected to an adjuster assembly 230 of one or both of the two support members 200, such as via a respective flex shaft, which may be curved and/or bent in some examples. In some circumstances, a transmission may connect an electrical motor 238 to an adjuster assembly 230.

With embodiments, such as generally illustrated in FIGS. 1B, 4B, and 9A-9C, an adjuster assembly 230 (e.g., an adjuster body 232 and/or an adjuster member 234) may include one or more portions (e.g., a tab 236) configured to contact and/or engage a slider 270 of a support member 200. For example and without limitation, a tab 236 may be configured as a protrusion extending from the adjuster body 232, such as generally in a Z-direction (e.g., downward in the Z-direction toward the mounting surface 106), and/or may be disposed offset from the adjuster member 234 relative to a Y-direction. Additionally and/or alternatively, a tab 236 may be configured as a surface, edge, slot, recess, body, and/or any other structure configured to engage a slider 270.

With embodiments, such as generally illustrated in FIGS. 1A, 4A, and 6-11, an adjuster assembly 230 (e.g., an adjuster body 232 and/or an adjuster member 234) may include one or more portions (e.g., a flange 242) configured to contact and/or engage an actuation body 330. An adjuster assembly 230 may be adjustable, such as in a generally Z-direction, via a flange 242. A flange 242 may extend generally in a Y-direction and/or may be disposed on an adjuster body 232, such as in a region of the adjuster body 232 opposite the adjuster member 234 relative to a Z-direction. A flange 242 may, additionally and/or alternatively, be disposed on the same or an opposite side of the adjuster assembly 230 relative to an adjuster pinion 250. Additionally and/or alternatively, a flange 242 may be configured as a surface, edge, slot, recess, body, and/or any other structure configured to engage an actuation body 330.

With embodiments, such as generally illustrated in FIGS. 4A, 4B, 6, 7, and 9A-11, an adjuster assembly 230 may include one or more portions (e.g., adjuster projections 244A, 244B) configured to contact and/or engage a support member 200. An adjuster projection 244A, 244B may extend from an adjuster body 232 (e.g., in a generally X-direction) and/or may facilitate rotation of an adjuster assembly 230 relative to a support member 200. An adjuster projection 244A, 244B may define and/or be disposed coaxially with an adjuster axis 240.

With embodiments, such as generally illustrated in FIGS. 4A, 4B, 6-8C, and/or 10A-11, a support member 200 may include an adjuster pinion 250. An adjuster pinion 250 may be configured to engage a toothed portion 154 of a track assembly 104. An adjuster pinion 250 may be rotatable about an adjuster pinion axis 252, which may extend generally in a Y-direction (e.g., perpendicular to a longitudinal direction of the track assembly 104). An adjuster pinion 250 may include one or more adjuster pinion teeth 254 configured to engage one or more track teeth 156 of a toothed portion 154. Adjuster pinion teeth 254 may extend radially outward from the adjuster pinion 250 relative to the adjuster pinion axis 252. An adjuster pinion 250 may be connected to an electric motor 238 directly and/or indirectly (e.g., via a flex shaft). For example and without limitation, an adjuster pinion 250 may be rotatably connected to an adjuster member 234, such as at a distal end of an adjuster member 234 that may be disposed opposite the adjuster body 232. An electric motor 238 may be operatively connected to an adjuster pinion 250 such that the adjuster pinion 250 is rotatable via the electric motor 238.

With embodiments, an adjuster pinion 250 (and the adjuster assembly 230, at least in some configurations) may be adjustable to a disengaged position (see, e.g., FIGS. 1B, 8A, 8B, 9A, 9B, 10A) in which the adjuster pinion 250 is disengaged from/not engaged with the toothed portion 154 (e.g., the adjuster pinion teeth 254 are not engaged with the track teeth 156) and/or an engaged position (see, e.g., FIGS. 1A, 8C, 9C, 10B) in which the adjuster pinion 250 is engaged with the toothed portion 154 (e.g., the adjuster pinion teeth 254 are engaged with the track teeth 156). A disengaged position may include, for example, an unaligned position (see, e.g., FIGS. 8A, 9A) in which the adjuster pinion 250 is disengaged from and not aligned with the toothed portion 154 (e.g., relative to a Z-direction) and/or an aligned position (see, e.g., FIGS. 1B, 8B, 9B, 10A) in which the adjuster pinion 250 is disengaged from and aligned with the toothed portion 154 (e.g., relative to a Z-direction). When in an unaligned position (see, e.g., FIGS. 8A, 9A), an adjuster pinion 250 and/or an adjuster assembly 230 (e.g., an adjuster member 234) may be disposed and/or extend obliquely or perpendicularly to a Z-direction. When in an aligned position (see, e.g., FIGS. 1B, 8B, 9B, 10A) and/or in an engaged position (see, e.g., FIGS. 1A, 8C, 9C, 10B), an adjuster pinion 250 and/or an adjuster assembly 230 (e.g., an adjuster member 234) may be disposed and/or extend generally parallel to a Z-direction. An adjuster pinion 250 and/or the adjuster assembly 230 may, for example, be adjusted generally downward in a Z-direction toward the disengaged position and/or may be adjusted generally upward in a Z-direction toward the engaged position. An adjuster pinion 250 and/or an adjuster assembly 230 may, when disengaged from the toothed portion 154 for example, be adjusted (e.g., moved, slid, rotated) generally laterally in a Y-direction toward an aligned position and/or toward an unaligned position.

With embodiments, an adjuster pinion 250 and/or an adjuster assembly 230, such as when in an unaligned position (see, e.g., FIGS. 8A, 9A), may be insertable into and/or removable from a track assembly 104, such as via being inserted into and/or removed from a track receptacle 130 through a track opening 128. When in an aligned position (see, e.g., FIGS. 1B, 8B, 9B, 10A), an adjuster pinion 250 and/or an adjuster assembly 230 may (i) restrict and/or prevent removal of the support member 200 from a track assembly 104 and/or (ii) facilitate adjustment of a support member 200 along a track assembly 104 (e.g., such as manual movement of a support assembly 102 by a user). When an adjuster pinion 250 and/or an adjuster assembly 230 is in the engaged position (see, e.g., FIGS. 1A, 8C, 9C, 10B), operation of an electric motor 238 may cause rotation of the adjuster pinion 250 about an adjuster pinion axis 252 and the adjuster pinion teeth 254 to engage the toothed portion 154 of the track assembly 104, which may cause movement of the support member 200 along the track assembly 104.

With embodiments, such as generally illustrated in FIGS. 1B, 5, and 8A-9C, a support member 200 may include a slider 270, which may be adjustable, movable, slidable, etc. in a direction generally parallel to an X-direction, for example. A slider 270 may be configured to engage and/or facilitate adjustment of the adjuster assembly 230 and/or an anchor 410, 450. Additionally and/or alternatively, a slider 270 may be configured to engage and/or facilitate adjustment (e.g., rotation) of an electrical connector 210 to engage one or more contacts 212 with a corresponding conductor 160. In examples, when a support assembly 102 is disposed on and/or connected to a track assembly 104, a slider 270 of the support assembly 102 and a toothed portion 154 of the track assembly 104 may be disposed on opposite sides of a track opening 128 relative to a Y-direction (e.g., a slider 270 may be disposed proximate/adjacent to a second track lip 134 and a toothed portion 154 may be disposed proximate/adjacent to a first track lip 132). A slider 270 may include one or more slider channels (e.g., a first slider channel 298A, a second slider channel 298B) configured to engage and/or adjust one or more anchors 410, 450 (e.g., via an anchor tab 418 of an associated anchor 410, 450).

Figure 11:
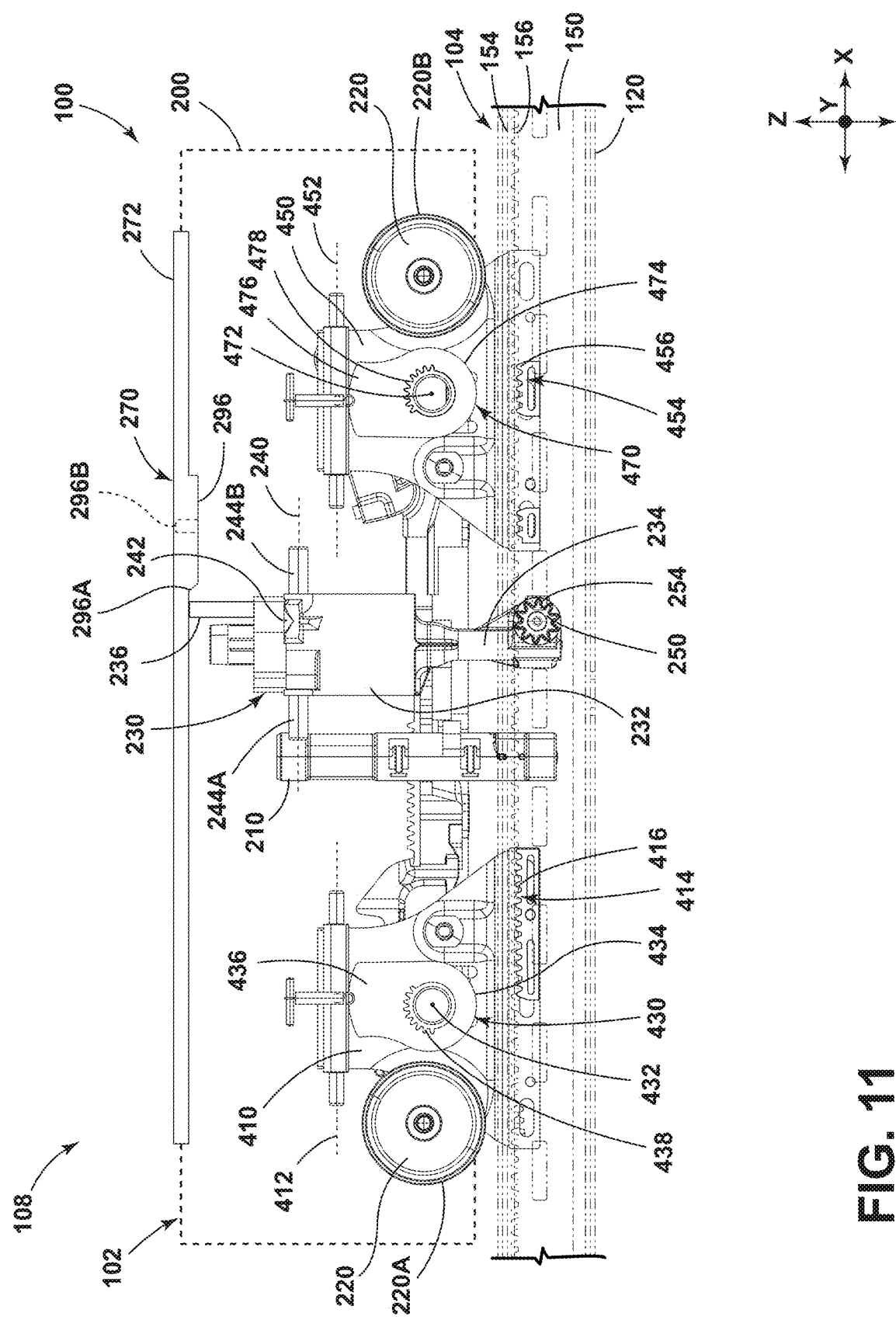
FIG. 11 is a side view generally illustrating an embodiment of a track system having a slider with a ramp portion according to teachings of the present disclosure.

With embodiments, such as generally illustrated in FIG. 11, a slider 270 may be disposed above an adjuster assembly 230 relative to a Z-direction. A tab 236 may extend from an adjuster assembly 230 generally upward in a Z-direction. A slider 270 may include a slider ramp portion 296 configured to engage a tab 236 of an adjuster assembly 230 to facilitate adjustment of the adjuster assembly toward an engaged position and/or a disengaged position. A slider ramp portion 296 may include a first section 296A configured to adjust/move an adjuster assembly 230 generally in a Z-direction and/or a second section 296B configured to adjust/move (e.g., rotate) an adjuster assembly 230 generally in a Y-direction toward an aligned position and/or an unaligned position. In examples, a first section 296A may extend generally in an X-direction in a sloped manner and/or a second section 296B may extend generally in a Y-direction in a sloped manner.

With embodiments, such as generally illustrated in FIG. 11, an adjuster assembly 230 and/or an adjuster pinion 250 may be disengaged from a track assembly 104 via adjusting a slider 270 (e.g., generally in an X-direction), which may cause a tab 236 to adjust, move, slide, etc. along the first section 296A of the ramp portion 296, which may cause the adjuster assembly 230 and/or the adjuster pinion 250 to disengage and/or move away from a toothed portion 154 of a track assembly 104 (e.g., generally downward in a Z-direction). In examples, adjusting a slider 270 (e.g., farther in the same X-direction) may cause a tab 236 to transfer from the first section 296A of the ramp portion 296 to a second section 296B and to then adjust, move, slide, etc. along the second section 296B, which may cause the adjuster assembly 230 and/or the adjuster pinion 250 to move out of Z-direction alignment with and/or away from a toothed portion 154 of a track assembly 104 (e.g., generally in a Y-direction). With embodiments, an adjuster assembly 230 and/or an adjuster pinion 250 may be adjusted into an aligned position and/or an engaged position via adjusting a slider 270 (e.g., in an opposite direction), which may involve the above described process being conducted in reverse.

In embodiments, such as generally illustrated in FIGS. 1B and 8A-9C, a slider 270 may be disposed between a top and bottom of the adjuster assembly 230. With embodiments, such as generally illustrated in FIGS. 1B, 5, and 9A-9C, a slider 270 may include a slider body 272, which may be configured as an elongated member and/or may extend generally in an X-direction. A slider 270 may include a slider protrusion 274, which may extend generally in a Z-direction. A slider protrusion 274 may be disposed on and/or connected to the slider body 272. A slider 270 and/or a slider protrusion 274 may include a guide surface 282 configured to engage, contact, and/or abut an adjuster assembly 230 (e.g., a tab 236). A guide surface 282 may extend generally in an X-direction and/or may face generally in a Y-direction. A guide surface 282 may include a first end 284, an intermediate section 286, and/or a second end 288. An intermediate section 286 may be offset from a first and/or second end 284, 288 (e.g., relative to a Y-direction) such that the guide surface 282 is sloped toward the intermediate section 286.

Figure 9A:
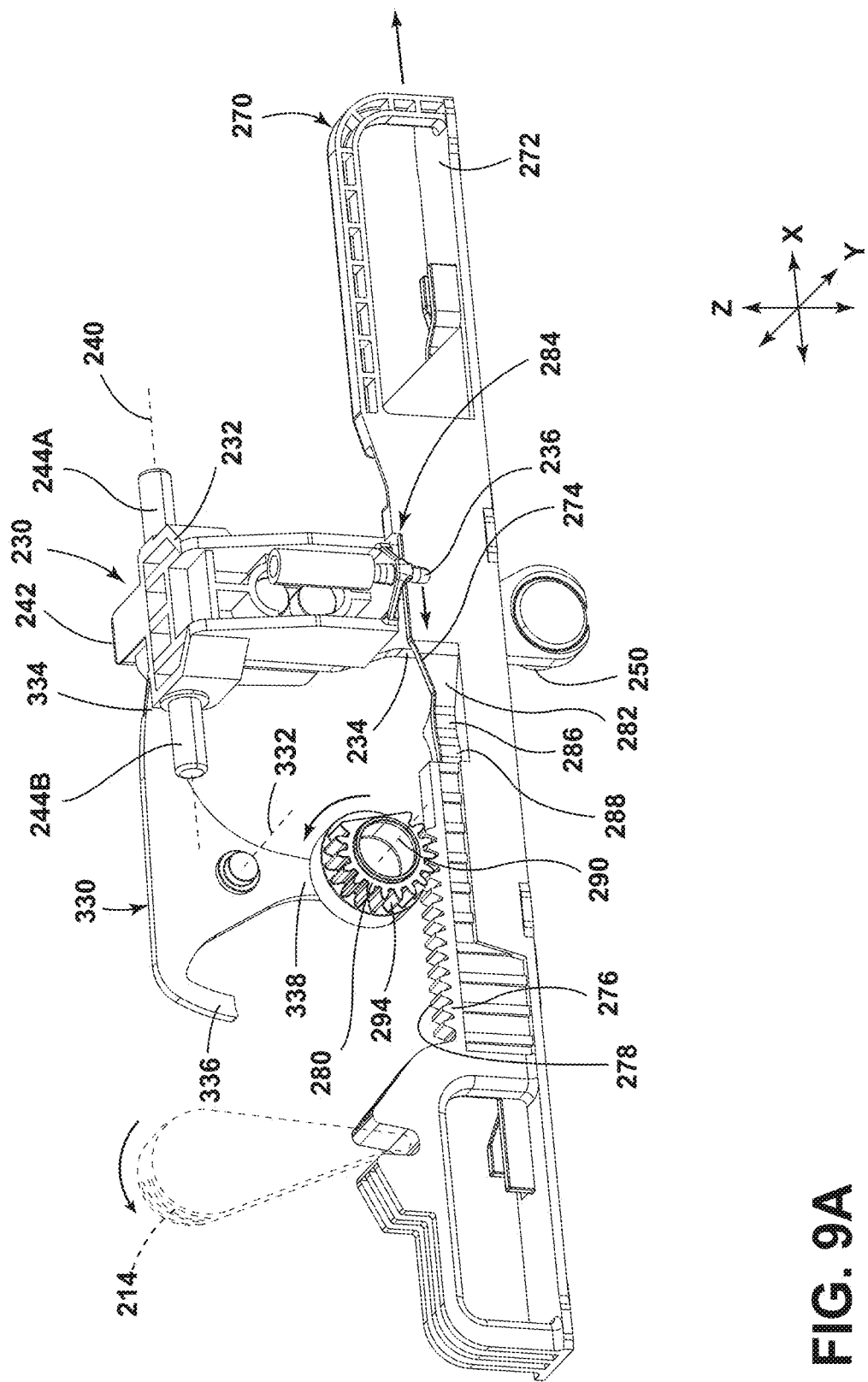
FIGS. 9A-9C are perspective views generally illustrating an embodiment of a support member with an adjuster pinion in an unaligned position, an aligned position, and an engaged position, respectively, according to teachings of the present disclosure.
Figure 9B:
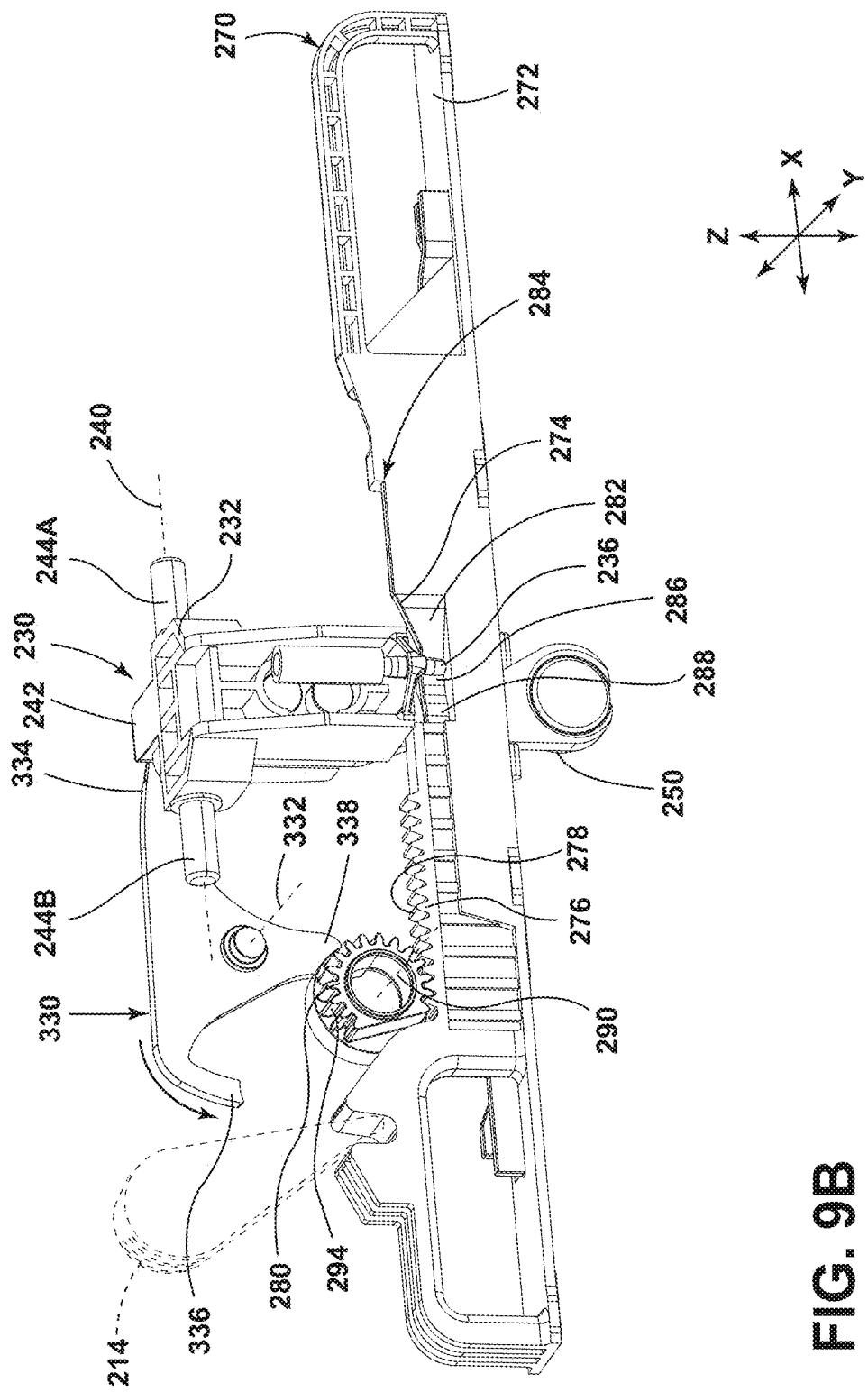
Figure 9C:
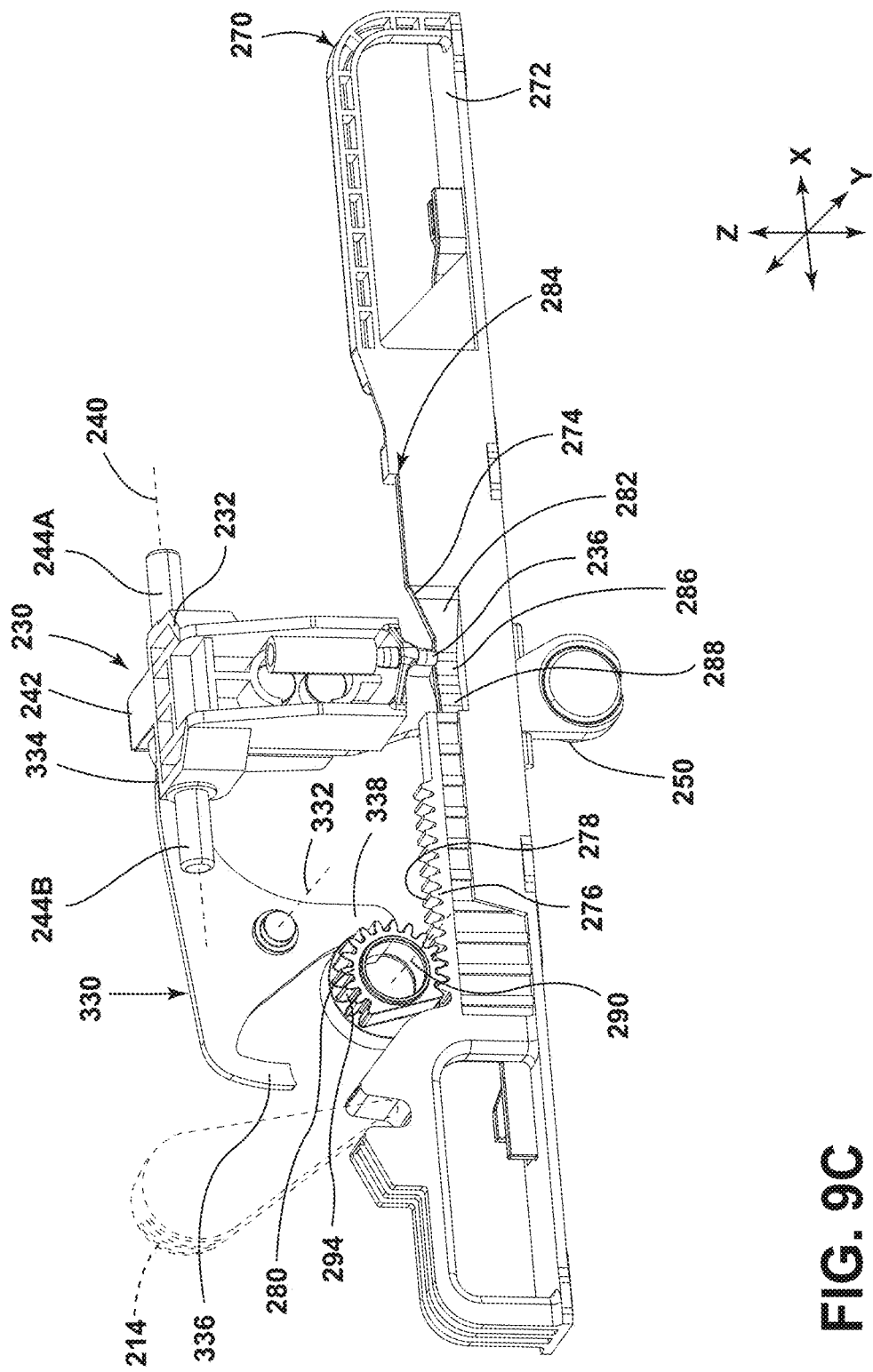

With embodiments, such as generally illustrated in FIGS. 9A-9C, when an adjuster pinion 250 and/or an adjuster assembly 230 is in an unaligned position (see, e.g., FIG. 9A), a tab 236 may be disposed adjacent to and/or in contact with a first end 284 of the guide surface 282 and/or may extend obliquely relative to a slider protrusion 274. An adjuster assembly 230 may, for example, be biased generally in a Y-direction (e.g., about an adjuster axis 240) such that a tab 236 is biased into contact with a slider protrusion 274 and/or a guide surface 282. When an adjuster pinion 250 and/or an adjuster assembly 230 is in an aligned position (see, e.g., FIG. 9B), a tab 236 may be disposed adjacent to and/or in contact with an intermediate section 286 of the guide surface 282 and/or may extend generally parallel to a slider protrusion 274. When an adjuster pinion 250 and/or an adjuster assembly 230 is in an engaged position, such as generally illustrated in FIG. 9C, a tab 236 may be disposed adjacent to and/or in contact with an intermediate section 286 of the guide surface 282, may extend generally parallel to a slider protrusion 274, and/or may be disposed spaced apart from a slider body 272 (e.g., generally in a Z-direction).

With embodiments, such as generally illustrated in FIGS. 1B, 5, and 9A-9C, a slider 270 may include one or more toothed slider portions 276 (e.g., gear racks) that may be configured to engage a slider pinion 280 of a support member 200, which may include one or more slider pinion teeth 294. A toothed slider portion 276 may include one or more slider teeth 278. A toothed slider portion 276 may generally extend in an X-direction. One or more (e.g., all) of the slider teeth 278 may be disposed one after another and/or aligned with one another in an X-direction. Slider teeth 278 may extend and/or protrude from a slider 270 and/or a toothed slider portion 276 generally in a Z-direction (e.g., upward in the Z-direction away the mounting surface 106).

With embodiments, such as generally illustrated in FIGS. 1B and/or 9A-9C, a support member 200 may include a slider pinion 280 configured to engage a toothed slider portion 276. A slider pinion 280 may include one or more slider pinion teeth 294 configured to engage one or more slider teeth 278. A slider pinion 280 may be rotatable about a slider pinion axis 290, that may extend generally in a Y-direction and/or that may be substantially coaxial with an engagement cam axis 314. A slider pinion 280 may be disposed on, connected to, and/or engaged with an engagement body 310 and/or an actuation shaft 292. A slider pinion 280 may be rotatable via rotating an actuation shaft 292, rotating an engagement body 310, and/or adjusting a slider 270 (e.g., generally in an X-direction). Additionally and/or alternatively, a slider pinion 280 may be configured to move independently of an actuation shaft 292 and/or an engagement body 310 (e.g., a slider pinion 280 may rotate without causing an actuation shaft 292 and/or an engagement body 310 to rotate, and/or the actuation shaft 292 may rotate without causing the slider pinion 280 to rotate). Rotating a slider pinion 280 may, at least in some situations, rotate an engagement body 310, such as with the slider pinion 280 and relative to the actuation shaft 292.

With embodiments, such as generally illustrated in FIGS. 1B and 9A-9C, a slider 270 may be actuated/moved in one or more of a variety of ways. For example, a slider 270 may be actuated via adjusting (e.g., rotating) a lever 214 of a support member 200, which may be engaged with and/or connected to the slider 270. A slider 270 may, for example, be actuated via an actuation shaft 292 and/or a slider pinion 280 connected thereto that may be engaged with a toothed slider portion 276 of the slider 270. Additionally or alternatively, a user may move a slider 270 directly and/or via a handle/lever/linkage.

With embodiments, such as generally illustrated in FIGS. 1A, 6, 10A, and 10B, a support member 200 may include an engagement body 310 that may be configured to facilitate adjustment of one or more anchors 410, 450 into and/or out of engagement with a toothed portion 154 of a track assembly 104. An engagement body 310 may be rotatable about an axis extending generally in a Y-direction (e.g., an engagement cam axis 314). An engagement body 310 may be operatively connected to one or more engagement member 350, 370 such that rotating the engagement body 310 adjusts the engagement members 350, 370 generally in an X-direction. An engagement body 310 may be disposed on, connected to, and/or engaged with an actuation shaft 292, an engagement cam 312, and/or a slider pinion 280. An engagement body 310 may be rotatable via rotating an engagement cam 312 (e.g., via rotating an actuation shaft 292) and/or rotating a slider pinion 280 (e.g., via adjusting a slider 270 with a lever 214). Additionally and/or alternatively, an engagement body 310 may be configured to, at least in some situations, rotate independently of an actuation shaft 292, an engagement cam 312, and/or a slider pinion 280. For example, rotation of the slider pinion 280 (e.g., via longitudinal movement of the slider 270) may cause rotation of the engagement body 310 relative to the actuation shaft 292 and/or the engagement cam 312, which may move the anchors 410, 450 without moving the adjuster assembly 230 (e.g., to maintain the adjuster assembly 230 in a disengaged position).

With embodiments, such as generally illustrated in FIGS. 1A, 6, 10A, and 10B, a support member 200 may include an engagement cam 312 that may be configured to facilitate adjustment of the adjuster assembly 230 and/or an adjuster pinion 250 into and/or out of engagement with a track assembly 104. An engagement cam 312 may be rotatable about an engagement cam axis 314, which may extend generally in a Y-direction. For example, an engagement cam 312 may be adjustable (e.g., rotatable) to a first position (see, e.g., FIG. 10A) and/or to a second position (see, e.g., FIG. 10B). An engagement cam 312 may include an engagement cam hub 316 and/or an engagement cam protrusion 318. An engagement cam protrusion 318 may extend radially from an engagement cam hub 316 relative to an engagement cam axis 314. An engagement cam 312 may be disposed on, connected to, and/or engaged with an actuation shaft 292 such that, for example, an engagement cam 312 is rotatable via rotating the actuation shaft 292. An engagement cam 312 may be connected to and/or engaged with an engagement body 310.

With embodiments, such as generally illustrated in FIGS. 1A and 1B, an engagement body 310, an engagement cam 312, and/or a slider pinion 280 may be rotatably connected to a support member 200 (and/or a second support member 200 disposed opposite the first support member 200). In examples, an engagement body 310, an engagement cam 312, and/or a slider pinion 280 may be connected to an actuation shaft 292 of a support member 200, which may be configured to rotate the engagement cam 312, the engagement body 310, and/or a slider pinion 280 about the engagement cam axis 314. For example and without limitation, an actuation shaft 292 may be configured to simultaneously engage and/or rotate a slider pinion 280 and/or an engagement cam 312. An actuation shaft 292 may be actuated manually and/or via a powered actuator (e.g., an electric motor), for example.

Figure 10A:
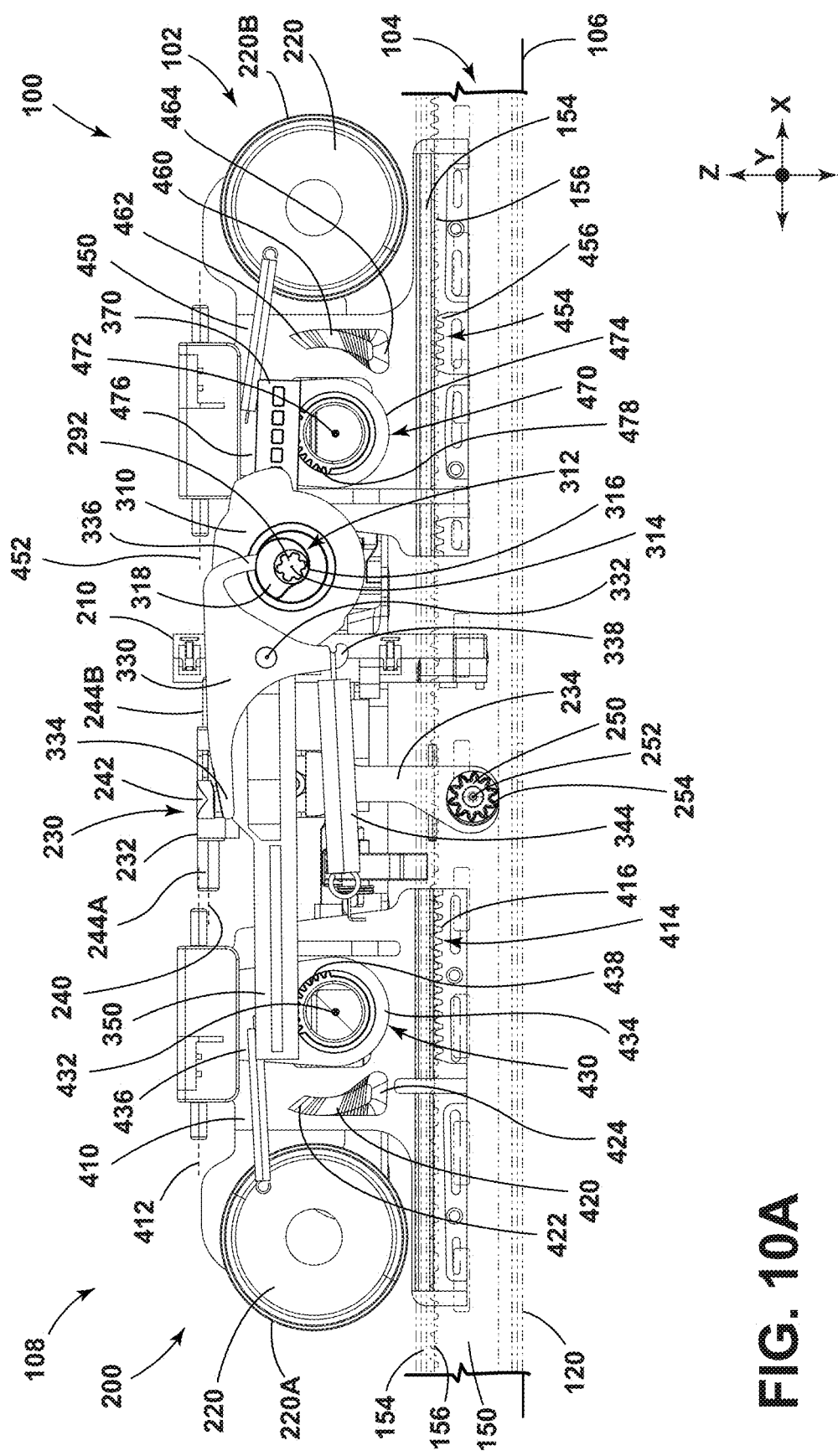
FIGS. 10A and 10B are side views generally illustrating an embodiment of a track system with an adjuster pinion in a disengaged position and an engaged position, respectively, according to teachings of the present disclosure.
Figure 10B:
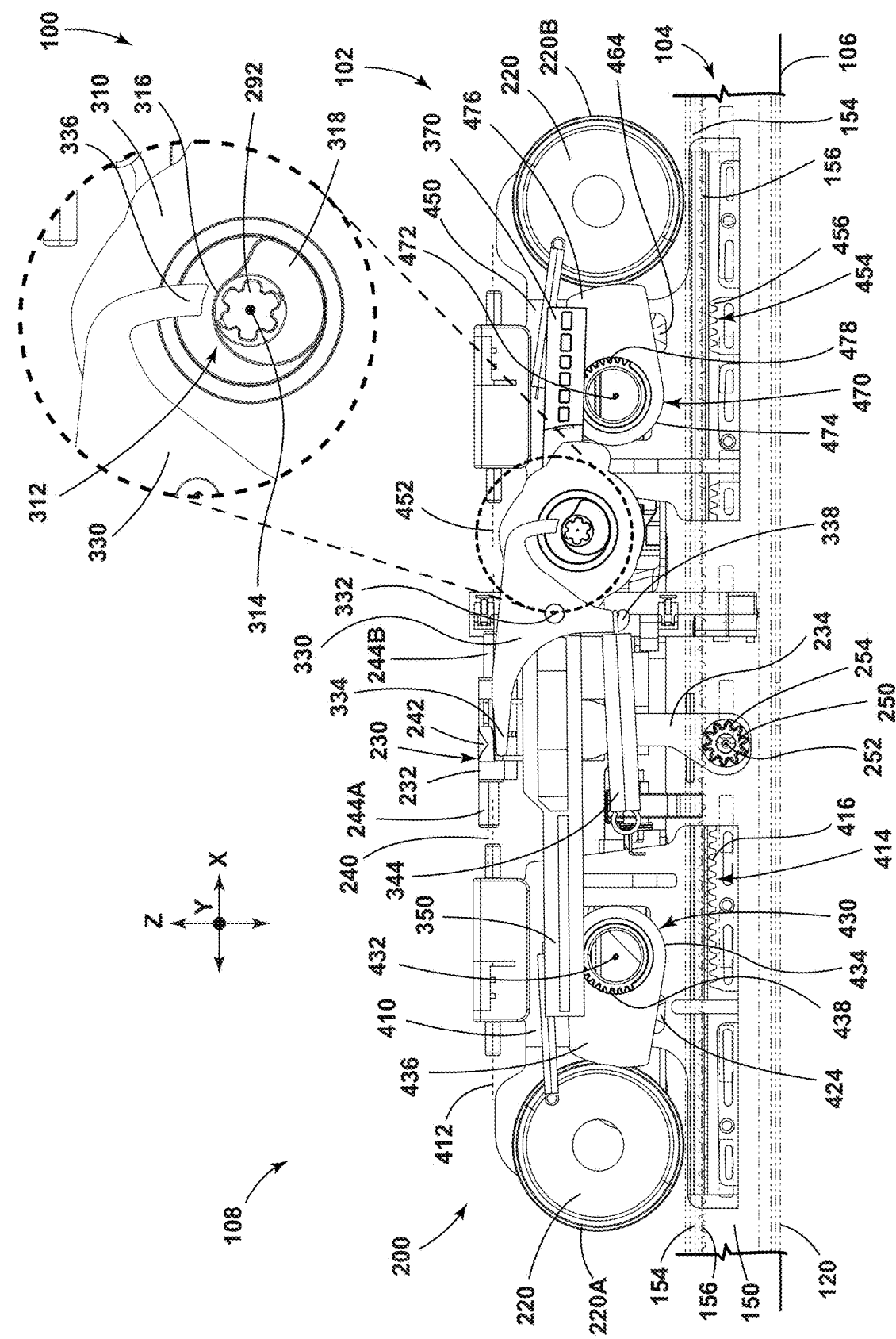

With embodiments, such as generally illustrated in FIGS. 1A, 10A, and 10B, a support member 200 may include an actuation body 330. An actuation body 330 may have and/or be rotatable about an actuation body axis 332, which may extend generally in a Y-direction. An actuation body 330 may include a first actuation portion 334 configured to engage, contact, and/or abut an adjuster assembly 230, such as a flange 242 for example. An actuation body 330 may include a second actuation portion 336 configured to engage, contact, and/or abut an engagement cam 312 (e.g., an engagement cam protrusion 318). An actuation body 330 may include a third actuation portion 338, which may engage and/or be connected to a biasing member 344 (e.g., a spring). A biasing member 344 may, additionally and/or alternatively, be connected to a body of a support member 200, such as at an end opposite the actuation body 330. A biasing member 344 may bias an actuation body 330 about an actuation body axis 332, which may bias a second actuation portion 336 into contact with an engagement cam 312 and/or may bias the first actuation portion 334 into contact with the adjuster assembly 230 (e.g., with the flange 242). The adjuster pinion 250 may be biased upward and into engagement with the toothed portion 154 and/or the track teeth 156, such as when the adjuster pinion 250 is in an engaged position. For example, biasing the first actuation portion 334 into contact with the adjuster assembly 230 (e.g., via the biasing member 344) may bias the adjuster assembly 230 upward, which may bias the adjuster pinion 250 upward and into engagement with the toothed portion 154 and/or the track teeth 156.

Figure 6:
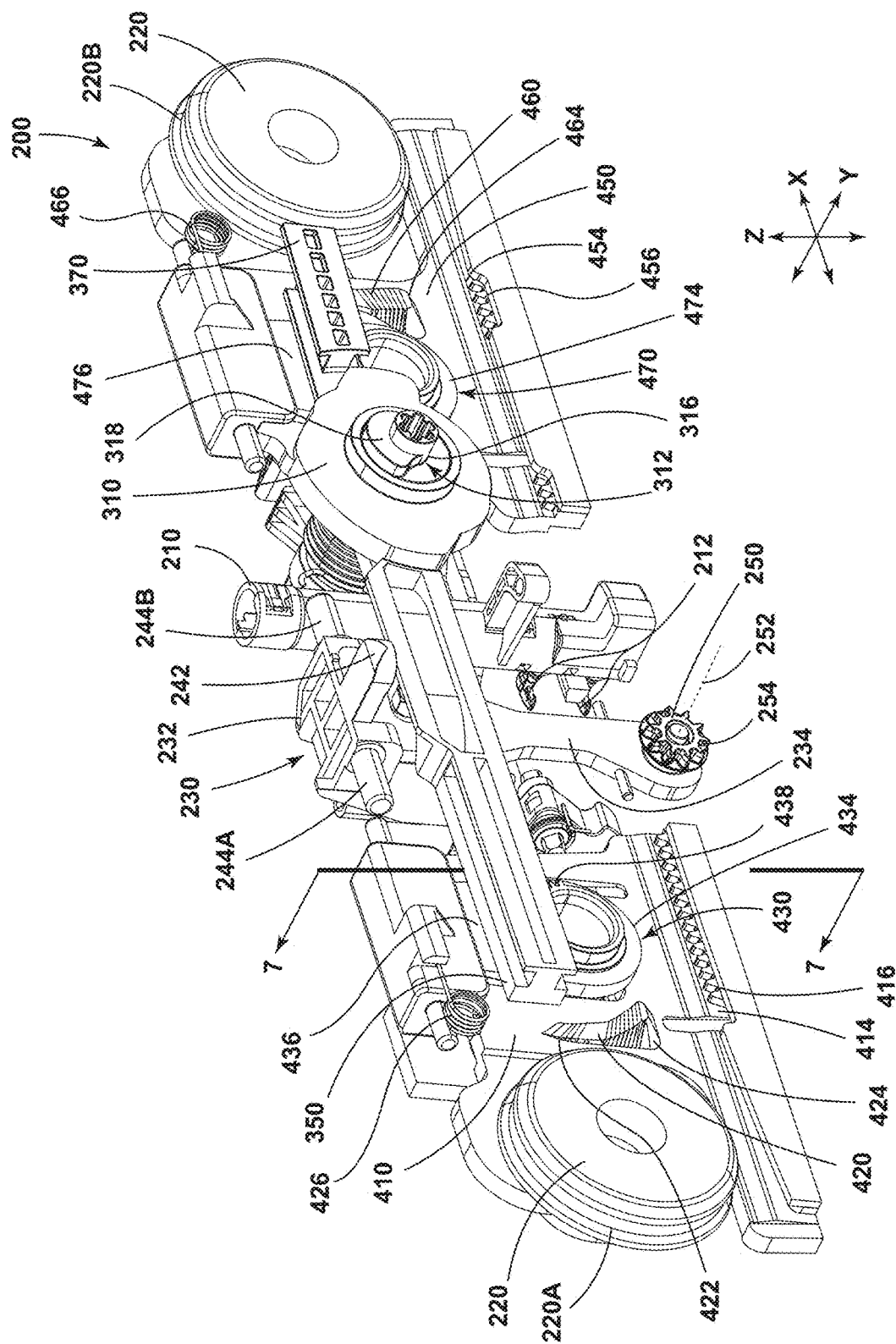
FIG. 6 is a perspective view generally illustrating an embodiment of a support member according to teachings of the present disclosure.
Figure 7:
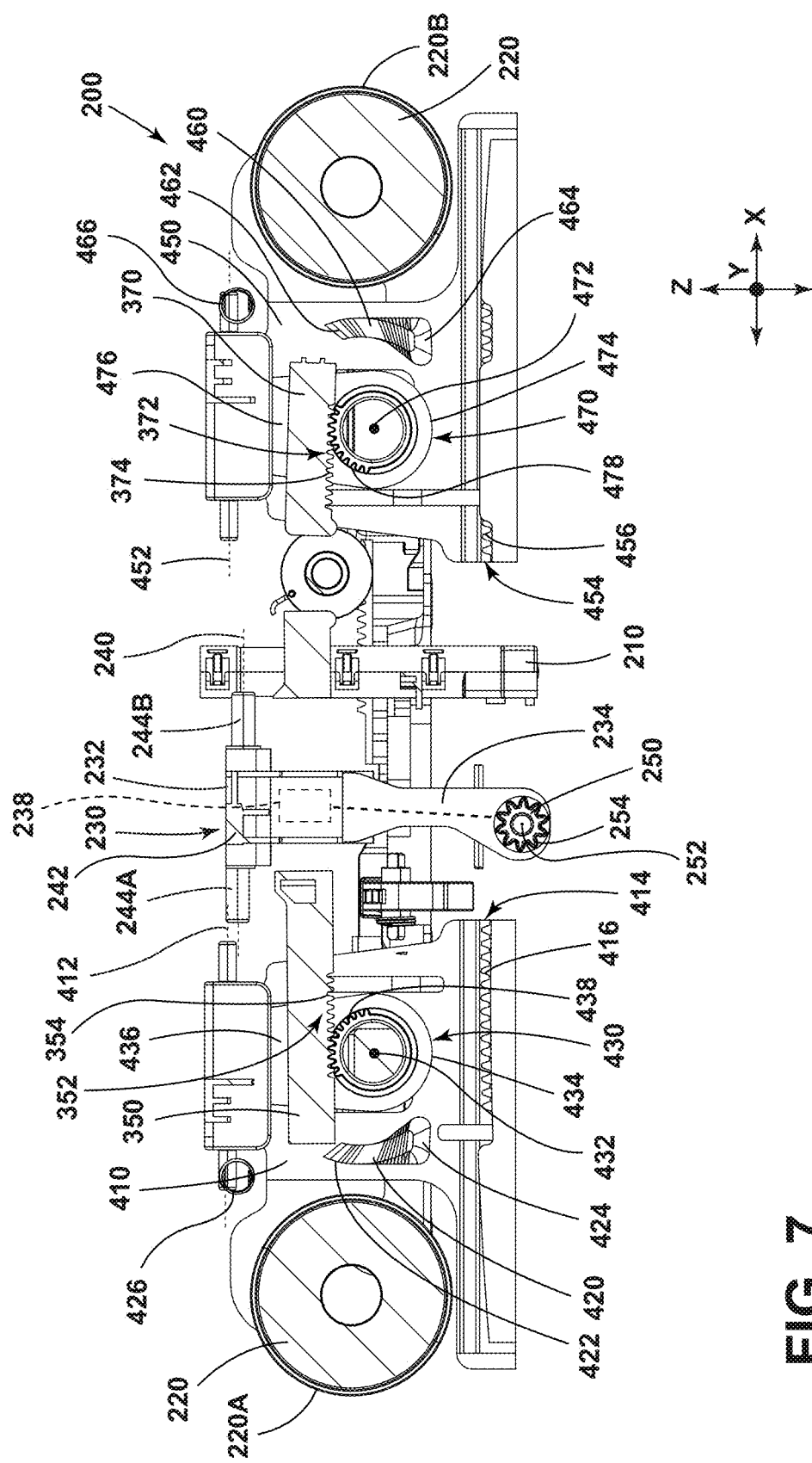
FIG. 7 is a cross-sectional view generally illustrating an embodiment of a support member according to teachings of the present disclosure.
Figure 8A:
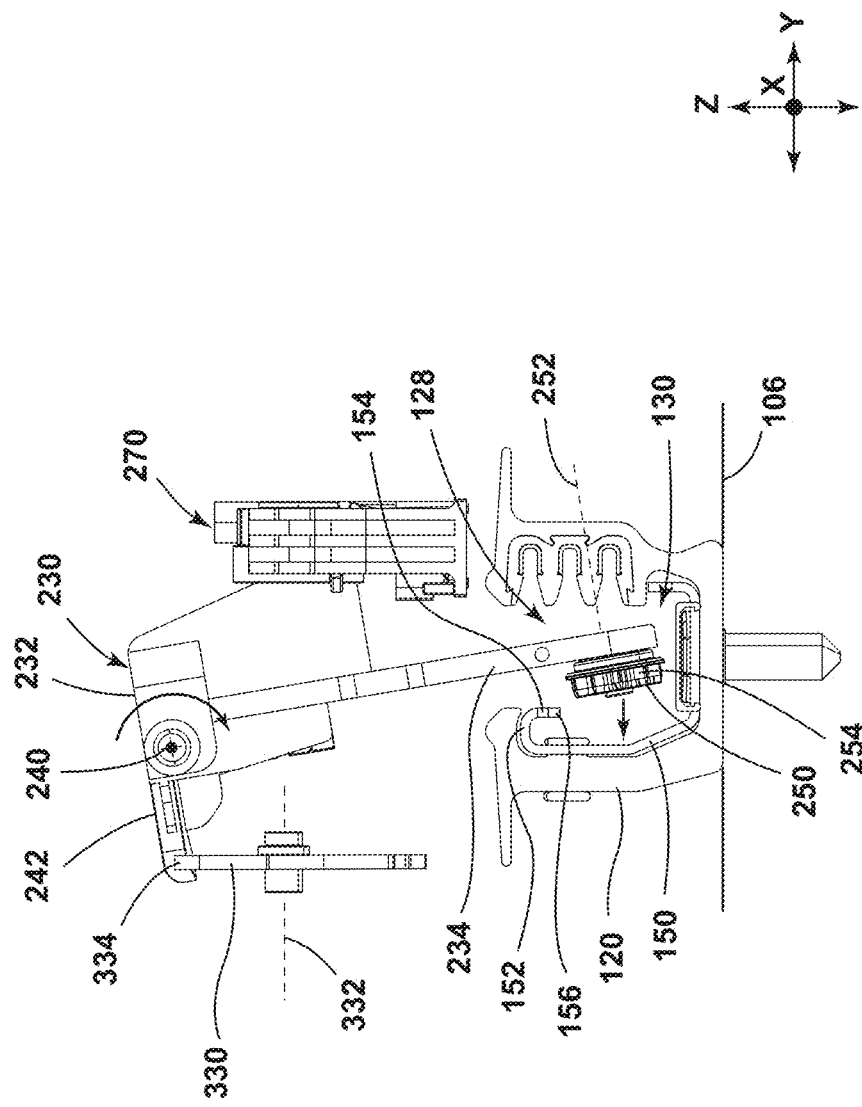
FIGS. 8A-8C are front views generally illustrating an embodiment of a track system with an adjuster pinion in an unaligned position, an aligned position, and an engaged position, respectively, according to teachings of the present disclosure.
Figure 8C:
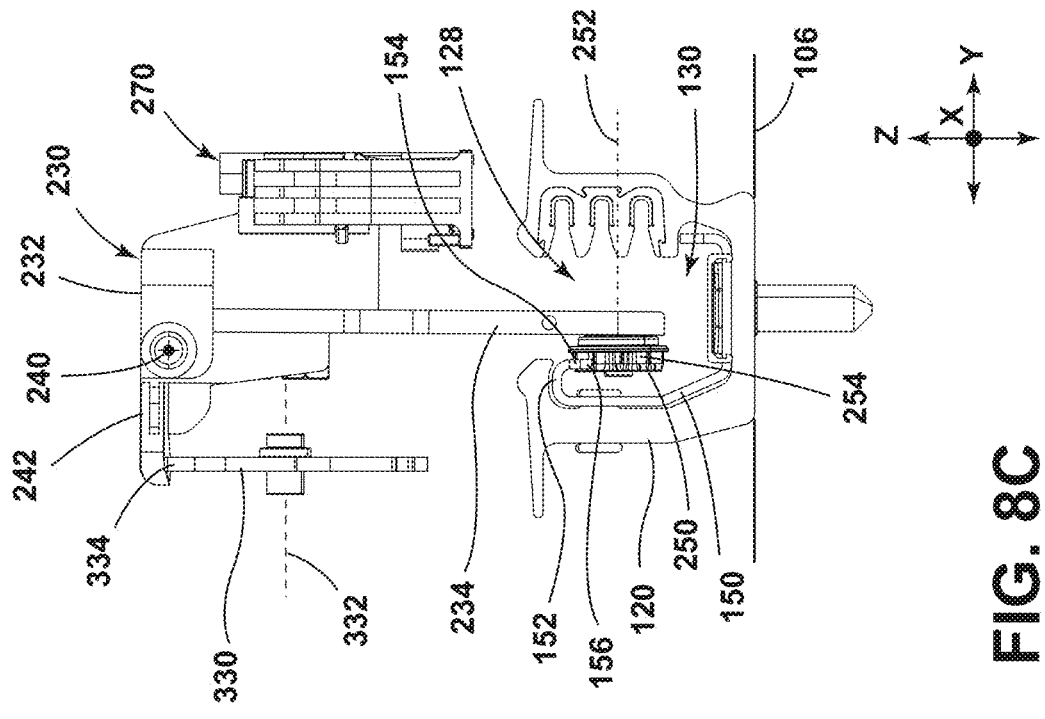
Figure 8B:
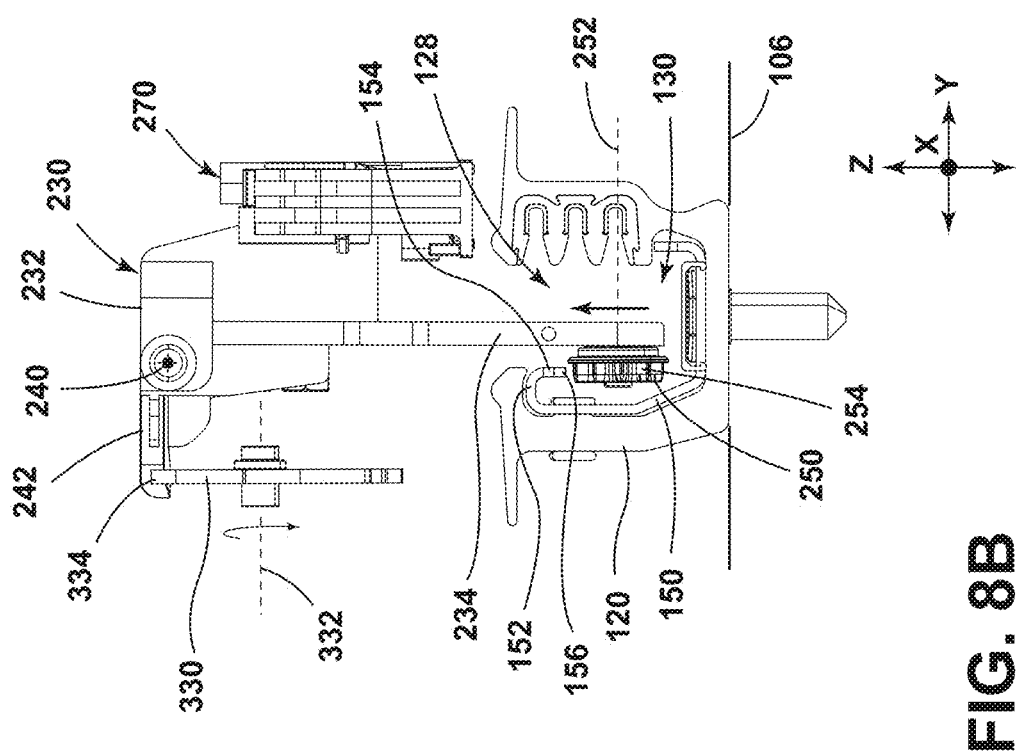

With embodiments, such as generally illustrated in FIGS. 1A, 6, 7, 10A, and/or 10B, a support member 200 may include one or more engagement members (e.g., a first engagement member 350, a second engagement member 370) configured to engage an anchor cam 430, 470. An engagement member 350, 370 may be an elongated member, which may extend generally in an X-direction. An engagement member 350, 370 may include an engagement member toothed portion 352, 372 (e.g., a gear rack), which may be configured to engage anchor cam teeth 438, 478 of an anchor cam 430, 470. An engagement member toothed portion 352, 372 may extend generally in an X-direction and/or may include one or more engagement member teeth 354, 374, which may be disposed one after another and/or aligned with one another in an X-direction. Engagement member teeth 354, 374 may extend and/or protrude from an engagement member 350, 370 and/or an engagement member toothed portion 352, 372 generally in a Z-direction (e.g., downward in the Z-direction toward the mounting surface 106). An engagement member 350, 370 may be operatively and/or adjustably connected to an engagement body 310, such as on an opposite side of the engagement body 310 from the engagement cam 312 for example. For example and without limitation, an engagement member 350, 370 may adjustably engage a slot or recess of the engagement body 310, which may be sloped toward an engagement cam axis 314, such that rotation of the engagement body 310 adjusts, moves, etc. the engagement member 350, 370 toward and/or away from the engagement cam axis 314. An engagement member 350, 370 may be operatively and/or adjustably connected to an anchor cam 430, 470. For example and without limitation, an engagement member 350, 370 may be adjusted, moved, slid, etc. generally in an X-direction via an engagement body 310, which may cause an engagement member toothed portion 352, 372 to engage and/or rotate an anchor cam 430, 470. A support member 200 is depicted in FIG. 6 without an actuation body 330 or a biasing member 344 to provide a clear view of the engagement body 310 and the engagement members 350, 370. A cross-sectional view through the engagement members 350, 370 of a support member 200 (e.g., in a plane perpendicular to a Y-direction) is generally depicted in FIG. 7 to provide a clear view of the engagement between the engagement members 350, 370 and the anchor cams 430, 470.

With embodiments, such as generally illustrated in FIGS. 1A, 6, 7, 10A, and/or 10B, a support member 200 may include one or more anchors (e.g., a first anchor 410, a second anchor 450) configured to engage and/or connect, secure, fix, etc. a support member 200 to a track assembly 104. An anchor 410, 450 may be adjustable generally in a Z-direction, may be adjustable generally in a Y-direction, and/or may be rotatable about an anchor axis 412, 452, which may extend generally in an X-direction. An anchor 410, 450 may include one or more toothed anchor portions 414, 454 (e.g., gear racks) configured to engage a toothed portion 154 of a track assembly 104 (see, e.g., FIGS. 6 and 7). A toothed anchor portion 414, 454 may include one or more anchor teeth 416, 456. A toothed anchor portion 414, 454 may extend generally in an X-direction. One or more (e.g., all) of the anchor teeth 416, 456 may be disposed one after another and/or aligned with one another in an X-direction. Anchor teeth 416, 456 may extend and/or protrude from an anchor 410, 450 and/or a toothed anchor portion 414, 454 generally in a Z-direction (e.g., upward in the Z-direction away the mounting surface 106). In examples, an anchor 410, 450 may be biased generally upward in a Z-direction (e.g., toward an engaged position), toward a toothed portion 154 generally in a Y-direction, and/or about an anchor axis 412, 452 such as via an anchor biasing member 426, 466. An anchor biasing member 426, 466 (e.g., a spring) may be connected to, disposed on, and/or engaged with a portion of a support member 200 (e.g., a body of the support member 200) and/or a portion of an anchor 410, 450.

With embodiments, such as generally illustrated in FIGS. 12A-13B, an anchor 410 may include an anchor tab 418 that may be configured to engage a slider 270 (e.g., via being at least partially received in a slider channel 298A). An anchor 410 may include an anchor adjustment portion 444 that may be configured to engage an anchor cam projection 440, which may facilitate adjustment of an anchor 410 generally in a Z-direction. An anchor 410 may include an anchor opening 446 that may be configured to, at least partially, receive an anchor cam base 442. An anchor 410 may include a tilt protrusion 448 that may be configured to engage an anchor cam protrusion 436, such as to restrict and/or prevent movement of an anchor 410 generally in a Z-direction and/or to cause an anchor 410 to tilt/rotate about a tilt axis that may extend generally in a Y-direction. An anchor tab 418, an anchor adjustment portion 444, and/or a tilt protrusion 448 may extend from an anchor 410 generally perpendicularly to the anchor 410 and/or may be disposed adjacent/proximate an anchor opening 446. Additionally or alternatively, an anchor adjustment portion 444 and/or a tilt protrusion 448 may be configured as a surface, edge, body, and/or other structure configured to engage an anchor cam projection 440 and/or an anchor cam protrusion 436. While the above description and FIGS. 12A-13B describe/show a first anchor 410 including an anchor tab 418, an anchor adjustment portion 444, an anchor opening 446, and/or a tilt protrusion 448, a second anchor 450 may (or may not) include an anchor tab, an anchor adjustment portion, an anchor opening, and/or a tilt protrusion which may be configured in the same or similar manner as corresponding features of a first anchor 410.

With embodiments, such as generally illustrated in FIGS. 6, 7, 10A, 10B, 13A, and/or 13B, an anchor 410, 450 may include a ramp portion (e.g., a first anchor ramp portion 420, a second anchor ramp portion 460) configured to engage an anchor cam 430, 470. A ramp portion 420, 460 may project from an anchor 410, 450 generally in a Y-direction. A ramp portion 420, 460 may extend along an anchor 410, 450, such as from a first ramp end 422, 462 to a second ramp end 424, 464, in a curved manner. A first ramp end 422, 462 may be disposed above a second ramp end 424, 464 relative to a Z-direction, and/or a second ramp end 424, 464 may project farther from an anchor 410, 450 generally in a Y-direction than a first ramp end 422, 462, such that the ramp portion 420, 460 is sloped generally downward in a Z-direction and away from the anchor 410, 450 generally in a Y-direction.

With embodiments, such as generally illustrated in FIGS. 1A, 6, 7, 10A, 10B and/or 12A-13B, a support member 200 may include an anchor cam (e.g., a first anchor cam 430, a second anchor cam 470), which may be configured to engage and/or facilitate adjustment of an anchor 410, 450. An anchor cam 430, 470 may be rotatable about an anchor cam axis 432, 472, which may extend generally in a Y-direction. An anchor cam 430, 470 may include an anchor cam hub 434, 474 and/or an anchor cam protrusion 436, 476. An anchor cam protrusion 436, 476 may extend radially from an anchor cam hub 434, 474 relative to an anchor cam axis 432, 472. An anchor cam protrusion 436, 476 may be configured to contact, abut, and/or engage a ramp portion 420, 460 of an anchor 410, 450. An anchor cam 430, 470 may include on or more anchor cam teeth 438, 478, which may extend radially relative to an anchor cam axis 432, 472, via which an anchor cam 430, 470 may engage an engagement member toothed portion 352, 372 of an engagement member 350, 370. An anchor cam 430, 470 may be rotatably connected to a support member 200 and/or an anchor 410, 450. In examples, an anchor cam 430, 470 may be connected to an engagement member toothed portion 352, 372 of an engagement member 350, 370, which may be configured to rotate the anchor cam 430, 470 about an anchor cam axis 432, 472.

Figure 12A:
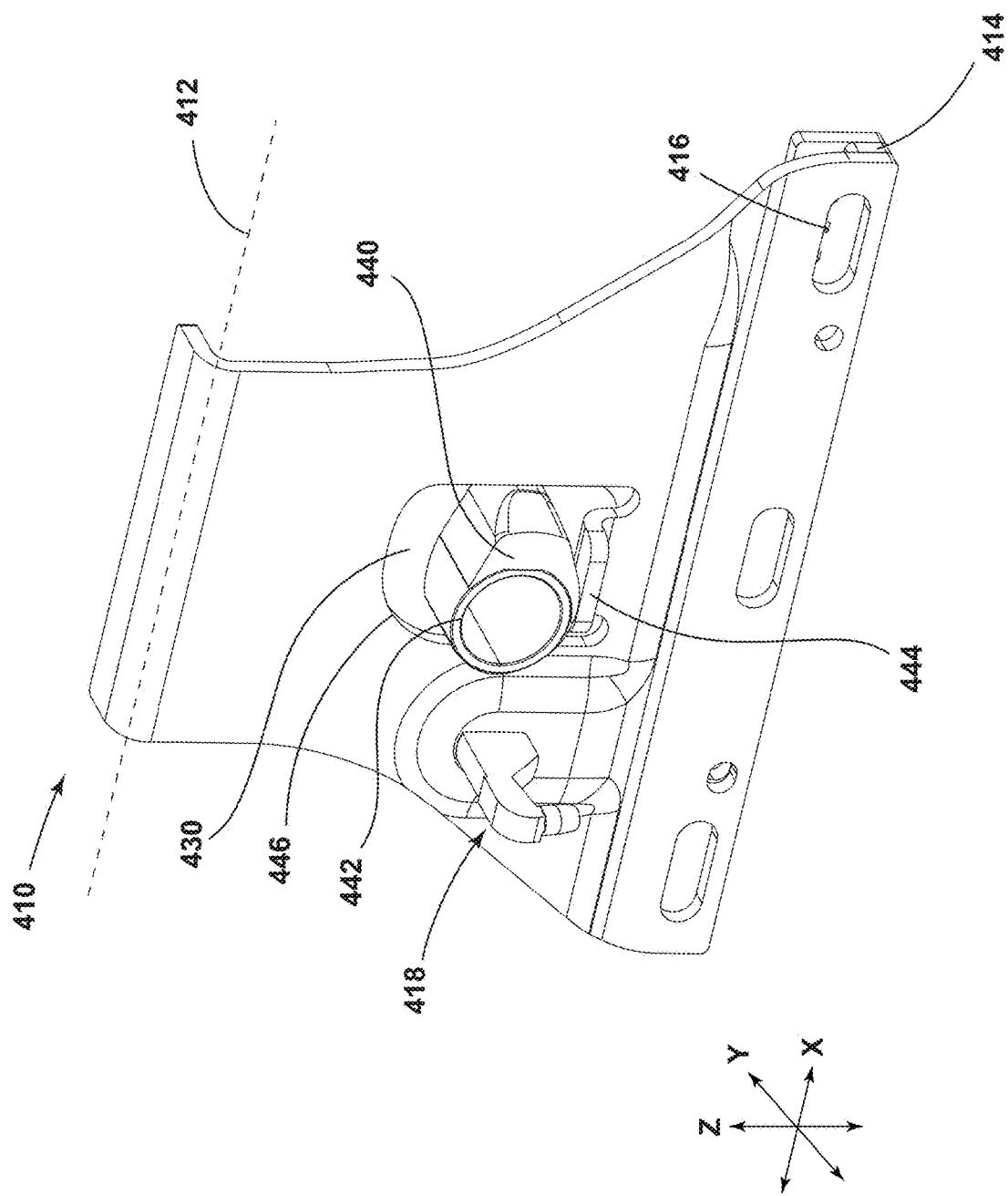
FIG. 12A is a perspective view generally illustrating an embodiment of an anchor cam and an anchor, with the anchor cam in a first position corresponding to an engaged position of the anchor, according to teachings of the present disclosure.
Figure 12B:
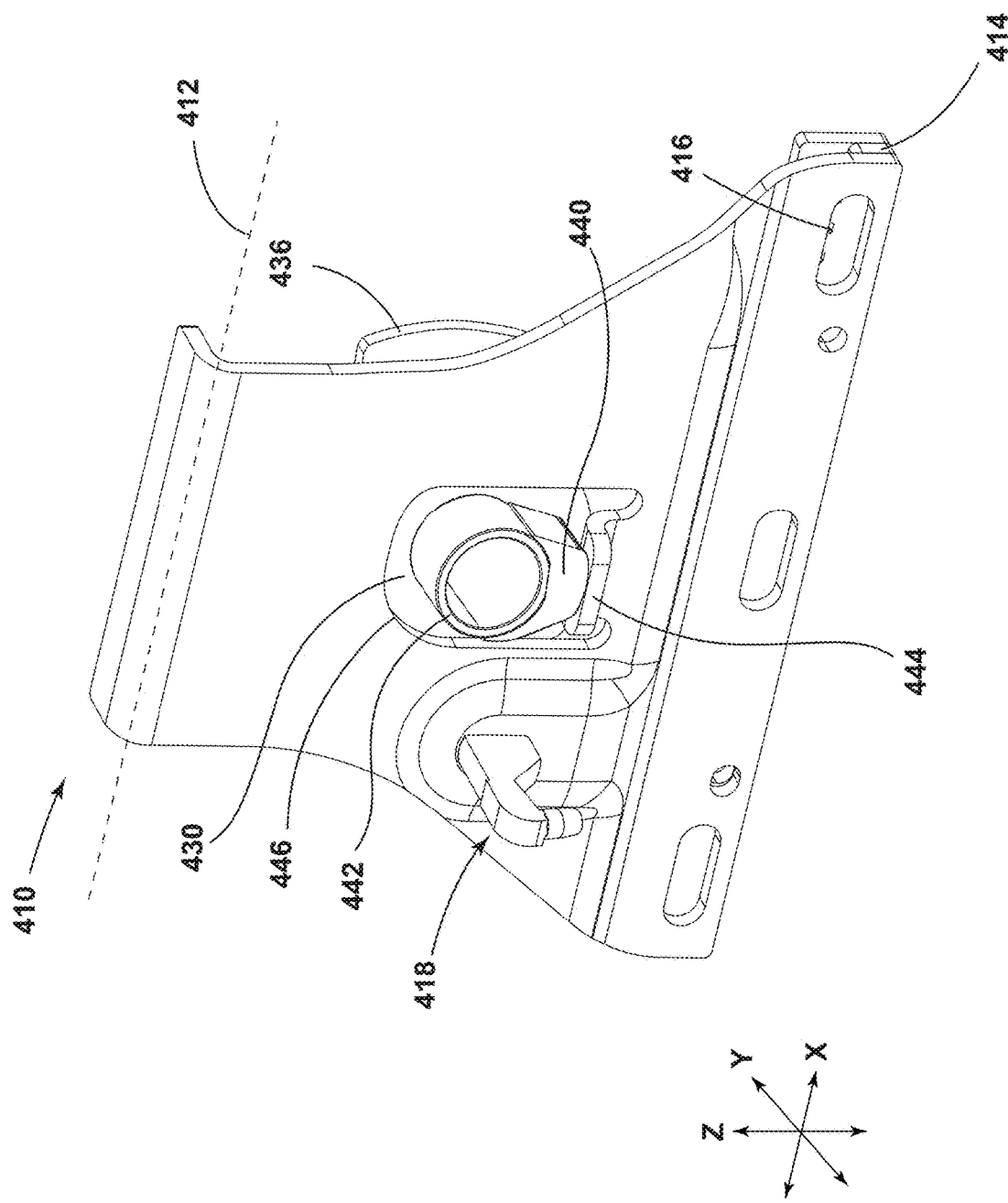
FIG. 12B is a perspective view generally illustrating an embodiment of an anchor cam and an anchor, with the anchor cam in a second position corresponding to a disengaged position of the anchor, according to teachings of the present disclosure.
Figure 13A:
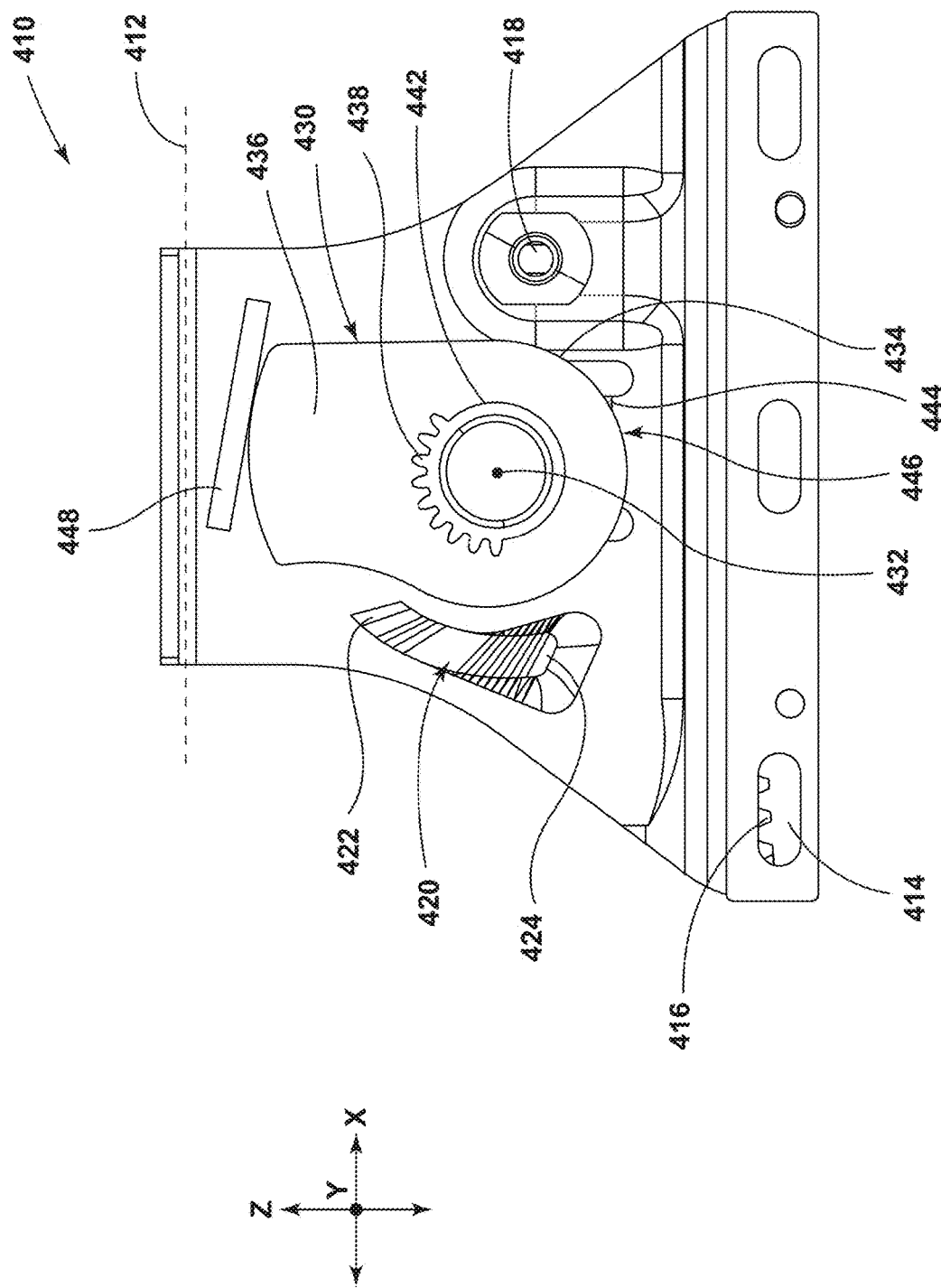
FIG. 13A is a perspective view generally illustrating an embodiment of an anchor cam and an anchor, with the anchor cam in a first position corresponding to an engaged position of the anchor, according to teachings of the present disclosure.
Figure 13B:
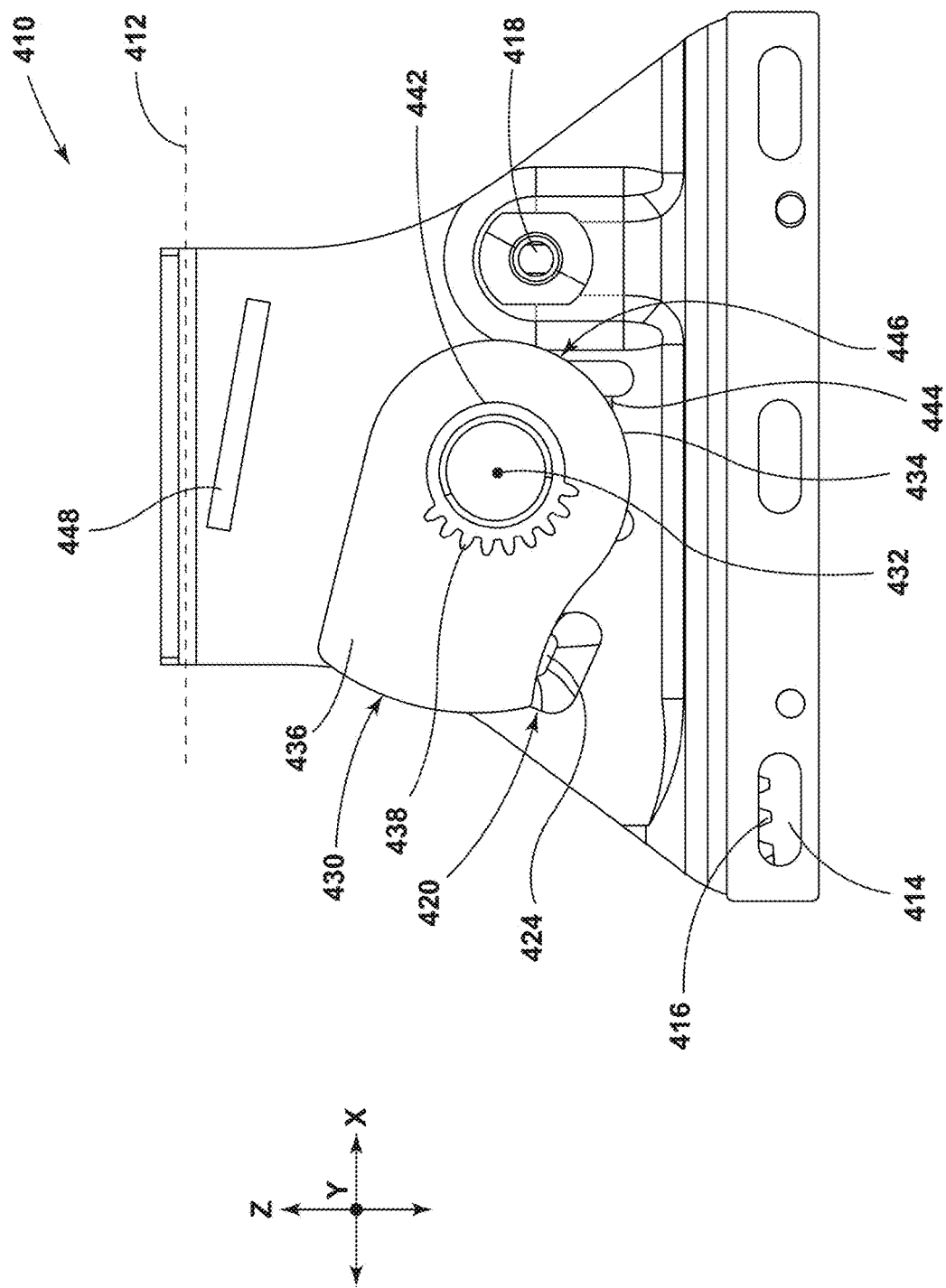
FIG. 13B is a perspective view generally illustrating an embodiment of an anchor cam and an anchor, with the anchor cam in a second position corresponding to a disengaged position of the anchor, according to teachings of the present disclosure.

With embodiments, such as generally illustrated in FIGS. 12A and 12B, an anchor cam 430 may include an anchor cam projection 440, which may be connected to and/or extend radially from an anchor cam base 442. An anchor cam projection 440 may be configured to contact, abut, and/or engage an anchor adjustment portion 444 of a corresponding anchor 410. An anchor cam base 442 may extend at least partially through an anchor opening 446 of an anchor 410 (e.g., generally in a Y-direction and/or perpendicular to the anchor 410). An anchor cam protrusion 436 and an anchor cam projection 440 may be disposed at and/or connected to opposite ends of an anchor cam base 442 such that, for example, the anchor cam protrusion 436 and the anchor cam projection 440 may be disposed on opposite sides of an anchor 410. An anchor cam 430 may be configured such that, when disengaging an anchor 410 from a track assembly 104, an anchor cam projection 440 may adjust an anchor 410 generally downward in a Z-direction to disengage the anchor 410 from a toothed portion 154 of the track assembly 104 (e.g., via engaging an anchor adjustment portion 444), such as prior to an anchor cam protrusion 436 adjusting the anchor 410 away from the toothed portion 154 generally in a Y-direction (e.g., via engaging a ramp portion 420), at least to some degree. Additionally or alternatively, an anchor cam 430 may be configured such that, when engaging an anchor 410 with a track assembly 104, an anchor cam protrusion 436 may adjust and/or allow adjustment of the anchor 410 toward a toothed portion 154 of the track assembly 104 generally in a Y-direction (e.g., via disengaging a ramp portion 420 and/or via an anchor biasing member 426 applying a biasing force), such as prior to an anchor cam projection 440 adjusting and/or allowing adjustment of an anchor 410 generally upward in a Z-direction to engage the anchor 410 with the toothed portion 154 (e.g., via disengaging an anchor adjustment portion 444 and/or an anchor biasing member 426 applying a biasing force). While the above description and FIGS. 12A and 12B describe/show a first anchor cam 430 including an anchor cam projection 440 and/or an anchor cam base 442, a second anchor cam 470 may (or may not) include an anchor cam projection and/or an anchor cam base which may be configured in the same or similar manner as corresponding features of a first anchor cam 430.

With embodiments, an adjuster assembly 230 may be engaged with a track assembly 104 (e.g., in an engaged position) when an anchor 410, 450 is disengaged from a track assembly 104 (see, e.g., FIG. 10B) such that the support member 200 is connected/secured to the track assembly 104 and/or is adjustable along the track assembly 104 such as via operation of an electric motor 238. Additionally and/or alternatively, an adjuster assembly 230 may be disengaged from and/or out of Z-direction alignment with a track assembly 104 (e.g., in an unaligned position) when an anchor 410, 450 is out of Z-direction alignment with a track assembly 104 such that the support member 200 is removable from and/or insertable into a track assembly 104 in a plurality of locations along the track assembly 104. An adjuster assembly 230 may be disengaged from a track assembly 104 (e.g., in an aligned and/or unaligned position) when an anchor 410, 450 is engaged with a track assembly 104 (see, e.g., FIG. 10A), which may protect the adjuster assembly 230 (e.g., an adjuster pinion 250) from damage (at least to some degree) in the event of a collision and/or an application of abnormal stress (e.g., stress exceeding that which occurs during normal use and/or operation) to the support assembly 102 and/or the track assembly 104. With embodiments, an adjuster assembly 230 and/or an adjuster pinion 250 may default to an aligned position and/or an anchor 410, 450 may default to an engaged position.

With embodiments, such as generally illustrated in FIG. 10A, when an engagement cam 312 is in a first engagement cam position, an adjuster assembly 230 and/or an adjuster pinion 250 may be disengaged from a track assembly 104, and/or a support member 200 may be secured (e.g., fixed) to a track assembly 104 and adjustment and/or removal of a support member 200 from the track assembly 104 may be restricted and/or prevented via an anchor 410, 450. In a first engagement cam position, a second actuation portion 336 may biased into contact with an engagement cam protrusion 318 (e.g., generally downward in a Z-direction), a first actuation portion 334 may (or may not) contact an adjuster assembly 230 (e.g., a flange 242), an anchor cam 430, 470 may be oriented such that (i) an anchor cam projection 440 does not engage/contact (or contacts to a lesser extent than in the second engagement cam position) an anchor adjustment portion 444 (see, e.g., FIG. 12A) and/or (ii) an anchor cam protrusion 436, 476 does not contact (or contacts to a lesser extent than in the second engagement cam position) a ramp portion 420, 460 (see, e.g., FIG. 13A), an anchor 410, 450 may be engaged with a track assembly 104 (e.g., a toothed portion 154), and/or an adjuster assembly 230 and/or an adjuster pinion 250 may be disengaged from a toothed portion 154 of a track assembly 104 (e.g., disposed in a disengaged position).

With embodiments, such as generally illustrated in FIG. 10B, when an engagement cam 312 is in a second engagement cam position, an adjuster assembly 230 and/or an adjuster pinion 250 may be engaged with a track assembly 104, and/or removal of a support member 200 from a track assembly 104 may be restricted and/or prevented via the adjuster assembly 230 (e.g., depending on the position of the adjuster assembly 230), and/or a support member 200 may be adjustable relative to the track assembly 104, such as by actuating a motor 238 of the adjuster assembly 230 and/or rotating the adjuster pinion 250. In a second engagement cam position, (a) a second actuation portion 336 may be spaced apart (e.g., radially) from an engagement cam hub 316 and/or an engagement cam protrusion 318, (b) a first actuation portion 334 may engage, contact, and/or press against an adjuster assembly 230 (e.g., a flange 242) such as generally in a Z-direction, (c) an anchor cam 430, 470 may be oriented such that (i) an anchor cam projection 440 engages and/or contacts an anchor adjustment portion 444 (see, e.g., FIG. 12B) and/or (ii) an anchor cam protrusion 436, 476 engages and/or contacts a ramp portion 420, 460 (see, e.g., FIG. 13B), (d) an anchor 410, 450 may be disengaged from a toothed portion 154 of a track assembly 104 (e.g., disposed in a disengaged position), and/or (e) an adjuster assembly 230 and/or an adjuster pinion 250 may be engaged with a toothed portion 154 of a track assembly 104 (e.g., disposed in an engaged position). Additionally and/or alternatively, a second actuation portion 336 may contact and/or be biased against an engagement cam hub 316 when an engagement cam 312 is in a second engagement cam position.

With embodiments, such as generally illustrated in FIGS. 8A-10B, engaging and/or connecting a support assembly 102 on a track assembly 104 may include inserting (e.g., moving sliding, rotating, etc.) an adjuster pinion 250, an adjuster assembly 230, and/or one or more anchors 410, 450 into a track receptacle 130 and adjusting an adjuster pinion 250, an adjuster assembly 230, and/or one or more anchors 410, 450 generally in a Y-direction into Z-direction alignment with a toothed portion 154 of a track assembly 104 (e.g., from an unaligned position toward an aligned position), which may include rotating the adjuster assembly 230 and/or the adjuster pinion 250 (e.g., about an adjuster axis 240) and/or an anchor 410, 450 (e.g., about an anchor axis 412, 452), such as by rotating an anchor cam 430, 470 and/or by adjusting, sliding, moving, etc. the adjuster assembly 230, an anchor 410, 450, and/or a slider 270 for example. Engaging and/or connecting a support assembly 102 on a track assembly 104 may include adjusting an adjuster assembly 230, an adjuster pinion 250, and/or an anchor 410, 450 into engagement with a toothed portion 154 of a track assembly 104 (e.g., from an aligned position toward an engaged position), such as by adjusting (e.g., moving sliding, rotating, etc.) an adjuster assembly 230, an adjuster pinion 250, and/or an anchor 410, 450 generally upward in a Z-direction, which may include adjusting (e.g., rotating, sliding, etc.) an actuation body 330, an engagement cam 312, an engagement body 310, an actuation shaft 292, and/or a slider 270. Disengaging and/or disconnecting a support assembly 102 and a track assembly 104 may include adjusting (e.g., moving sliding, rotating, etc.) an adjuster assembly 230, an adjuster pinion 250, and/or an anchor 410, 450, in an opposite direction for example, which may involve the above described process being conducted in reverse.

With embodiments, an adjuster assembly 230 and/or an adjuster pinion 250 may be (i) adjusted to an aligned position and/or an unaligned position via actuating a lever 214, and/or (ii) adjusted to an engaged position and/or an aligned position via rotating an actuation shaft 292. In embodiments, an anchor 410, 450 may be adjusted to an engaged position, an aligned position, and/or an unaligned position via actuating a lever 214 and/or rotating an actuation shaft 292. Rotation of an actuation shaft 292 may, in some circumstances, be restricted and/or prevented when the adjuster assembly 230 and/or adjuster pinion 250 is in an unaligned position (e.g., is not in an aligned position or an engaged position). Additionally and/or alternatively, actuation of a lever 214 may, in some circumstances, be restricted and/or prevented when an adjuster assembly 230 and/or adjuster pinion 250 is engaged with a toothed portion 154 (e.g., is not in an aligned position or an unaligned position).

With embodiments, actuating (e.g., adjusting, rotating, etc.) a lever 214 of a support member 200 may cause the lever 214 to contact and/or press against a slider 270, which may cause the slider 270 to slide, shift, move, etc. (e.g., generally in an X-direction) relative to an adjuster assembly 230 and/or an anchor 410, 450 which may cause a toothed slider portion 276 of the slider 270 to engage a slider pinion 280 (e.g., via slider pinion teeth 294 and slider teeth 278), which may cause the slider pinion 280 to rotate about an axis (e.g., an engagement cam axis 314). Rotation of the slider pinion 280 (i) may not cause an actuation shaft 292 to rotate such that an engagement cam 312 is not adjusted and does not adjust the adjuster assembly 230, and/or (ii) may cause an engagement body 310 to rotate, which may adjust an anchor 410, 450 to an engaged position, an aligned position, and/or an unaligned position. Adjusting a slider 270 via an actuating a lever 214 may, additionally and/or alternatively, cause the slider 270 to (i) engage a tab 236 of an adjuster assembly 230, which may adjust an adjuster assembly 230 and/or an adjuster pinion 250 to an aligned position and/or an unaligned position, and/or (ii) engage an anchor tab 418, which may adjust and/or facilitate adjustment of an anchor 410 to an engaged position, an aligned position, and/or an unaligned position. For example and without limitation, a slider channel 298A of a slider 270 may engage an anchor tab 418 to adjust and/or guide an anchor 410 from an unaligned position to an aligned position and/or from an aligned position to an engaged position, which may supplement an anchor biasing member 426 that may (e.g., simultaneously) adjust/bias the anchor 410 (e.g., via providing a biasing force that biases the anchor 410 toward the engaged position).

With embodiments, rotating an actuation shaft 292 may rotate an engagement cam 312, which may adjust an adjuster assembly 230 and/or an adjuster pinion 250 to an engaged position and/or an aligned position. Additionally and/or alternatively, rotating an actuation shaft 292 may rotate an engagement body 310 (e.g., via rotating the engagement cam 312), which (i) may not cause a slider pinion 280 to rotate such that movement of a slider 270 is not caused by rotation of the actuation shaft 292, and/or (ii) may adjust an engagement member 350, 370 and/or an anchor cam 430, 470 to adjust an anchor 410, 450 to an engaged position, an aligned position, and/or an unaligned position.

For example and without limitation, upon insertion of a support assembly 102 into a track assembly 104, the anchors 410, 450, an adjuster assembly 230, and/or an adjuster pinion 250 may be disposed in or proximate to unaligned positions, such as to facilitate insertion/connection. Then, a lever 214 may be actuated (e.g., by a user, an actuator, and/or a biasing mechanism) to adjust a slider 270, which may (i) adjust an adjuster assembly 230 and/or an adjuster pinion 250 from an unaligned position to an aligned position (e.g., via engaging a tab 236) and/or (ii) adjust an anchor 410, 450 from an unaligned position and/or an aligned position to an engaged position (e.g., via an anchor biasing member 426, 466, engaging an anchor tab 418, and/or rotating a slider pinion 280 to rotate an engagement body 310 without rotating the actuation shaft 292). Subsequently, an actuation shaft 292 may be rotated, which may (i) adjust an adjuster assembly 230 and/or an adjuster pinion 250 from an aligned position to an engaged position (e.g. via rotating an engagement cam 312) and/or (ii) adjust an anchor 410, 450 from an engaged position to an aligned position and/or unaligned position (e.g., via rotating the engagement cam 312 to rotate an engagement body 310 without rotating the slider pinion 280), which may unlock the support assembly 102 from the track assembly 104 to facilitate movement of the support assembly 102 via the adjuster assembly 230 along the track assembly 104. An actuation shaft 292 may be rotated in an opposite direction or a lever 214 actuated in an opposite direction, for example, to reengage an anchor 410, 450 with a track assembly 104 and/or to disengage an adjuster assembly 230 and/or an adjuster pinion 250 from a track assembly 104, which may involve one or more portions of the above described process being conducted in reverse.

With embodiments, such as generally illustrated in FIGS. 8A, 8B, 9A, and 9B, adjusting an adjuster pinion 250 and/or an adjuster assembly 230 toward an aligned position (see, e.g., FIGS. 8B and 9B) and/or an unaligned position (see, e.g., FIGS. 8A and 9A) may include rotating the adjuster pinion 250 and/or the adjuster assembly 230 about an adjuster axis 240, such as by adjusting, sliding, moving, etc. the adjuster assembly 230 and/or a slider 270. A slider 270 and/or an adjuster assembly 230 may be adjusted, moved, slid, etc. (e.g., generally in the X-direction), which may cause a tab 236 to engage and/or slide along the guide surface 282, which may cause the adjuster assembly 230 and/or an adjuster pinion 250 to adjust (e.g., rotate) toward an aligned position and/or an unaligned position. Adjusting a slider 270 and/or an adjuster assembly 230 to adjust an adjuster pinion 250 into Z-direction alignment with a toothed portion 154 of a track assembly 104 (e.g., from an unaligned position to an aligned position) may include actuating a lever 214, which may cause the slider 270 to slide, shift, move, etc. relative to the adjuster assembly 230 (e.g., generally in an X-direction), which may cause a tab 236 to slide along a guide surface 282 toward an intermediate section 286 (e.g., from a first end 284), which may cause the adjuster assembly 230 to rotate about an adjuster axis 240, which may adjust the adjuster pinion 250 generally in a Y-direction (e.g., away from the slider 270) toward the aligned position (see, e.g., FIGS. 8B and 9B). The slider 270 and/or the adjuster assembly 230 may be adjusted/moved, in an opposite direction for example, to adjust the adjuster assembly 230 and/or an adjuster pinion 250 toward an unaligned position (see, e.g., FIGS. 8A and 9A), such as from an aligned position (see, e.g., FIGS. 8B and 9B), which may involve the above described process being conducted in reverse.

With embodiments, such as generally illustrated in FIGS. 8C, 9C, 10A, and 10B, adjusting an adjuster pinion 250 and/or an adjuster assembly 230 toward an engaged position (see, e.g., FIGS. 1A, 8C, 9C, 10B) and/or a disengaged position, such as an aligned position (see, e.g., FIGS. 1B, 8B, 9B, 10A), may include adjusting an adjuster assembly 230 generally in a Z-direction, such as by rotating an actuation shaft 292 and/or an engagement cam 312. Adjusting (e.g., rotating) an engagement cam 312 may cause an actuation body 330 to rotate about an actuation body axis 332, which may cause the actuation body 330 to adjust, move, push, etc. an adjuster assembly 230 generally in a Z-direction, which may cause the adjuster assembly 230 and/or an adjuster pinion 250 to adjust toward an engaged position and/or a disengaged position (e.g., an aligned position). Adjusting (e.g., rotating) an engagement cam 312 about an engagement cam axis 314 may, additionally, alternatively, and/or simultaneously, rotate an engagement body 310, which may cause an engagement member 350, 370 to adjust, move, slide, etc. generally in an X-direction, which may cause an anchor cam 430, 470 to adjust (e.g., rotate about an anchor cam axis 432, 472), which may cause an anchor 410, 450 to engage and/or disengage a toothed portion 154 of a track assembly 104, which may (e.g., temporarily) fix the support member 200 and the track assembly 104 to one another. By configuring an actuation shaft 292 to simultaneously rotate an engagement body 310 and/or an engagement cam 312 for example, an adjuster assembly 230 may be engaged with a track assembly 104 and/or one or more anchors 410, 450 may be disengaged from a track assembly 104 (or vice versa) by a single action (e.g., rotating an actuation shaft 292), which may facilitate adjustment of a support assembly 102 relative to a track assembly 104.

With embodiments, such as generally illustrated in FIGS. 8C, 9C, 10A, and 10B, when adjusting an engagement cam 312 to adjust an adjuster assembly 230 and/or an adjuster pinion 250 toward an engaged position (see, e.g., FIGS. 1A, 8C, 9C, 10B), for example from a disengaged and/or an aligned position (see, e.g., FIGS. 1B, 8B, 9B, 10A), an engagement cam 312 may be rotated (e.g., counter-clockwise) about an engagement cam axis 314, such as via rotating an actuation shaft 292, which may cause a second actuation portion 336 engaging an engagement cam protrusion 318 to adjust, move, slide, off of the engagement cam protrusion 318 (e.g., to a position in which the second actuation portion 336 is disposed spaced slightly apart from and/or in contact with an engagement cam hub 316), which may cause the actuation body 330 to rotate (e.g., clockwise) about an actuation body axis 332, which may cause a first actuation portion 334 to move and/or adjust generally upward in a Z-direction such that it adjusts, presses, pushes, etc. a flange 242 of an adjuster assembly 230 generally upward in a Z-direction, which may cause the adjuster assembly 230 and/or an adjuster pinion 250 to move generally upward in a Z-direction to engage a toothed portion 154 of a track assembly 104. An actuation shaft 292 and/or an engagement cam 312 may be adjusted, moved, rotated, etc., in an opposite direction for example, to adjust (i) the adjuster assembly 230 and/or an adjuster pinion 250 toward a disengaged position (see, e.g., FIGS. 8B, 9B, 10A) such as from an engaged position (see, e.g., FIGS. 8C, 9C, 10B).

With embodiments, such as generally illustrated in FIGS. 10A and 10B, engaging and/or disengaging an anchor 410, 450 from a toothed portion 154 of a track assembly 104 may, additionally and/or alternatively, include adjusting (e.g., rotating) an engagement body 310 about an axis extending generally in a Y-direction (e.g., an engagement cam axis 314). An engagement body 310 may be rotated to engage and/or disengage an anchor 410, 450 from a track assembly 104 via actuating a lever 214 (e.g., when adjusting an adjuster assembly 230 and/or adjuster pinion 250 between an aligned position and an unaligned position) and/or via rotating an actuation shaft 292 (e.g., when adjusting an adjuster assembly 230 and/or adjuster pinion 250 between an engaged position and an aligned position).

For example and without limitation, disengaging an anchor 410, 450 from a toothed portion 154 of a track assembly 104 (e.g., adjusting an anchor 410, 450 from the position of FIGS. 10A, 12A, 13A toward the position of FIGS. 10B, 12B, 13B) may include rotating an engagement body 310 about an axis extending generally in a Y-direction (e.g., an engagement cam axis 314), such as via actuating a lever 214 (e.g., when adjusting an adjuster assembly 230 from an aligned position to an unaligned position) and/or via rotating an actuation shaft 292 (e.g., when adjusting an adjuster assembly 230 from an aligned position to an engaged position), which may adjust, move, slide, etc. an engagement member 350, 370 generally in an X-direction away from the engagement body 310 (e.g., via adjusting an engagement member 350, 370 within a slot or groove of the engagement body 310), which may cause an engagement member toothed portion 352, 372 to engage, contact, etc. one or more anchor cam teeth 438, 478, which may cause an anchor cam 430, 470 to rotate about an anchor cam axis 432, 472, which may adjust an anchor cam projection 440 (e.g., from the position of FIG. 12A toward the position of FIG. 12B) to engage, contact, and/or press against an anchor adjustment portion 444 (e.g., opposite a biasing force applied to an anchor 410, 450 by an anchor biasing member 426, 466), which may adjust and/or move an anchor 410, 450 generally downward in a Z-direction, which may cause a toothed anchor portion 414, 454 to disengage a toothed portion 154 of a track assembly 104.

With embodiments, rotating an anchor cam 430, 470 about an anchor cam axis 432, 472 may, additionally, alternatively, and/or simultaneously, cause an anchor cam protrusion 436, 476 to slide along a ramp portion 420, 460 generally downward in a Z-direction toward a second ramp end 424, 464 such as from a first ramp end 422, 462 (e.g., from the position of FIG. 13A toward the position of FIG. 13B, and/or opposite a biasing force applied to an anchor 410, 450 by an anchor biasing member 426, 466), which may adjust and/or move an anchor 410, 450 generally/substantially in a Y-direction (e.g., via rotating about an anchor axis 412, 452), which may cause a toothed anchor portion 414, 454 to move away from and/or out of Z-direction alignment with a toothed portion 154 of a track assembly 104. An engagement body 310 may be adjusted, moved, rotated, etc., in an opposite direction for example, to adjust an anchor 410, 450 into engagement with a toothed portion 154 of a track assembly 104, which may involve the above described process being conducted in reverse.

With embodiments, a method of operating a track system 100 may include providing a track assembly 104 and one or more support assemblies 102. The support assembly 102 and/or a support member 200 may be disposed on and/or connected with a track assembly 104, such as by inserting the support member 200 into the track assembly 104 a vertical direction (e.g., a Z-direction). At least a portion of an adjuster assembly 230 (e.g., an adjuster pinion 250) of a support member 200 of the support assembly 102 may be adjusted/moved (e.g., rotated), such as from an unaligned position, into alignment with a toothed portion 154 of the track assembly 104 such that the adjuster assembly 230 and/or the adjuster pinion 250 is disposed in an aligned position. Adjusting an adjuster assembly 230 and/or an adjuster pinion 250 from an unaligned position to an aligned position may include rotating the adjuster pinion 250 and/or the adjuster assembly 230 about an adjuster axis 240, such as by adjusting, sliding, moving, etc. the adjuster assembly 230 and/or a slider 270 for example. Adjusting an adjuster pinion 250 and/or an adjuster assembly 230 toward an engaged position, from an aligned position for example, may include adjusting (e.g., moving sliding, rotating, etc.) an adjuster pinion 250 and/or an adjuster assembly 230 generally upward in a Z-direction toward the engaged position to engage the adjuster pinion 250 and the toothed portion 154 of the track assembly 104, such as by adjusting (e.g., rotating) an actuation shaft 292, an engagement cam 312, an actuation body 330, and/or an engagement body 310. When in the engaged position, the adjuster assembly 230 and/or an electric motor 238 thereof may be actuated such that the adjuster pinion 250 rotates, which may move the support assembly 102 along and/or relative to the track assembly 104 to adjust a longitudinal position of the support member 200. An electrical component of the support assembly 102 may, for example, control operation of the electric motor 238. Disengaging the adjuster assembly 230 and/or the adjuster pinion 250 from the toothed portion 154 may facilitate removal of the support assembly 102 and/or may mitigate damage to the adjuster assembly 230 in the event of a vehicle collision. Disengaging and/or disconnecting a support assembly 102 and a track assembly 104 may include adjusting (e.g., moving, sliding, rotating, etc.) an adjuster pinion 250 and/or an adjuster assembly 230, in an opposite direction for example, which may involve the above described process being conducted in reverse.

While embodiments of a track system 100 are generally described in connection with a support assembly 102 connected with a track assembly 104, multiple support assemblies 102, which may include one or a plurality of support members 200, may be connected to the same track assembly 104, which may include one or a plurality of pairs of tracks 120, 150 (e.g., for a plurality of seats in a vehicle 108).

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A track system, comprising:
   a track assembly including a toothed portion; and
   a support assembly including a support member removable from and adjustably connected to the track assembly;
   wherein the support member includes an adjuster pinion;
   wherein the adjuster pinion is configured to engage the toothed portion of the track assembly;
   wherein the adjuster pinion is adjustable to an engaged position in which the adjuster pinion and the toothed portion are engaged with one another;
   wherein the adjuster pinion is adjustable to an unaligned disengaged position in which the adjuster pinion and the toothed portion are not engaged with one another;
   the adjuster pinion is adjustable to an aligned disengaged position;
   when the adjuster pinion is in the aligned disengaged position, the adjuster pinion and the toothed portion are at least partially aligned with one another relative to a Z-direction;

when the adjuster pinion is in the unaligned disengaged position, the adjuster pinion and the toothed portion are not substantially aligned with one another relative to the Z-direction;

the adjuster pinion is adjustable generally in the Z-direction to engage with and disengage from the toothed portion;

when the adjuster pinion is in the aligned disengaged position, the adjuster pinion is adjustable generally in a Y-direction to move out of Z-direction alignment with the toothed portion to the unaligned disengaged position; and when the adjuster pinion is in the unaligned disengaged position, the adjuster pinion does not substantially restrict removal of the support member from the track assembly generally in the Z-direction.

2. The track system of claim 1, wherein:
the track assembly includes an inner track and an outer track; and
the toothed portion is disposed on an underside of the inner track.

3. The track system of claim 2, wherein:
the toothed portion from the inner track extends substantially downward in the Z-direction; and
the adjuster pinion is adjustable in the Y-direction.

4. The track system of claim 1, wherein:
the support member includes a slider movable generally in an X-direction;
the support member includes an adjuster assembly including the adjuster pinion;
the adjuster assembly includes a tab engaged with the slider; and
when the adjuster pinion is in the engaged position, the adjuster pinion is adjustable generally in the Z-direction to disengage the toothed portion and move the adjuster pinion to the aligned disengaged position via moving the slider generally in the X-direction to cause the tab to engage a ramped portion of the slider.

5. The track system of claim 4, wherein, when the adjuster pinion is in the unaligned disengaged position, the adjuster pinion is adjustable generally in the Y-direction, via moving the slider farther in the X-direction, to move out of Z-direction alignment with the toothed portion.

6. A method of operating the track system of claim 1, the method comprising:
connecting the support member and the track assembly in the Z-direction;
adjusting the adjuster pinion from the unaligned disengaged position to the engaged position; and
adjusting a longitudinal position of the support member relative to the track assembly via the adjuster pinion.

7. The method of claim 6, wherein:
adjusting the adjuster pinion from the unaligned disengaged position to the engaged position includes adjusting the adjuster pinion from the unaligned disengaged position to the aligned disengaged position and adjusting the adjuster pinion from the aligned disengaged position to the engaged position; and
adjusting the adjuster pinion from the aligned disengaged position to the engaged position includes engaging at least some pinion teeth of the adjuster pinion with at least some track teeth of the toothed portion via adjusting the adjuster pinion generally upward in the Z-direction from the aligned disengaged position, in which the adjuster pinion and the toothed portion are aligned with one another relative to the Z-direction, to the engaged position.

8. The method of claim 7, wherein:
the support member includes an adjuster assembly, the adjuster assembly including the adjuster pinion; and
adjusting the adjuster pinion upward in the Z-direction from the aligned disengaged position to the engaged position includes rotating an actuation body of the support member such that a first actuation portion of the actuation body engages and presses the adjuster assembly generally upward in the Z-direction.

9. The method of claim 8, wherein:
the support member includes an engagement cam having an engagement cam hub and an engagement cam protrusion extending from the engagement cam hub; and
rotating the actuation body includes disengaging a second actuation portion of the actuation body from the engagement cam protrusion via rotating the engagement cam.

10. The method of claim 8, wherein:
adjusting the adjuster pinion from the aligned disengaged position to the engaged position includes adjusting the adjuster pinion in the Y-direction from the unaligned disengaged position, in which the adjuster pinion and the toothed portion are not aligned with one another relative to the Z-direction, to the aligned disengaged position; and
adjusting the adjuster pinion generally in the Y-direction from the unaligned disengaged position to the aligned disengaged position includes engaging a tab connected to the adjuster pinion and a slider of the support member with one another via adjusting the slider generally in an X-direction.

11. The method of claim 7, wherein adjusting the adjuster pinion from the aligned disengaged position to the engaged position includes disengaging an anchor of the support member from the toothed portion of the track assembly.

12. The method of claim 11, wherein disengaging the anchor from the toothed portion of the track assembly includes:
adjusting an engagement member of the support member generally in an X-direction via rotating an engagement body of the support member;
rotating an anchor cam of the support member via adjusting the engagement member generally in the X-direction;
engaging an anchor cam protrusion of the anchor cam with an anchor ramp portion of the anchor via rotating the anchor cam; and
moving the anchor via engaging the anchor cam protrusion with the anchor ramp portion of the anchor.

13. The method of claim 12, wherein:
engaging the anchor cam protrusion with the anchor ramp portion of the anchor moves the anchor generally in the Y-direction; and
disengaging the anchor from the toothed portion of the track assembly includes:
engaging an anchor cam projection of the anchor cam with an anchor adjustment portion of the anchor via rotating the anchor cam; and
moving the anchor substantially in a vertical direction via engaging the anchor cam projection with the anchor adjustment portion of the anchor.

14. The method of claim 6, wherein:
adjusting the adjuster pinion from the unaligned disengaged position to the engaged position includes adjusting the adjuster pinion generally in the Y-direction from the unaligned disengaged position, in which the adjuster pinion and the toothed portion are not aligned with one another relative to the Z-direction, to the aligned disengaged position, in which the adjuster pinion and the toothed portion are aligned with one another relative to the Z-direction;

adjusting the adjuster pinion from the aligned disengaged position to the engaged position includes engaging at least some pinion teeth of the adjuster pinion with at least some track teeth of the toothed portion via adjusting the adjuster pinion generally upward in the Z-direction from the aligned disengaged position to the engaged position;

adjusting the adjuster pinion generally in the Y-direction from the unaligned disengaged position to the aligned disengaged position includes engaging a tab connected to the adjuster pinion and a slider of the support member with one another via adjusting the slider generally in an X-direction; and adjusting the adjuster pinion generally upward in the Z-direction from the aligned disengaged position to the engaged position includes further interacting the tab and the slider with one another via continuing to adjust the slider generally in the X-direction.

15. The track system of claim 1, wherein the adjuster pinion is rotatably connected with an adjuster assembly that is rotatable about an adjuster axis that is parallel with an X-direction.

16. A track system, comprising:

a track assembly including a toothed portion; and a support assembly including a support member removable from and adjustably connected to the track assembly;

wherein the support member includes an adjuster pinion;

wherein the adjuster pinion is configured to engage the toothed portion of the track assembly;

wherein the adjuster pinion is adjustable to an engaged position in which the adjuster pinion and the toothed portion are engaged with one another;

the adjuster pinion is adjustable to an unaligned disengaged position in which the adjuster pinion and the toothed portion are not engaged with one another;

the adjuster pinion includes an aligned disengaged position;

the support member includes an actuation shaft and an actuation body;

the actuation shaft is operatively connected to the actuation body such that the actuation body is rotatable via rotation of the actuation shaft; and the actuation body is configured to adjust the adjuster pinion generally in a Z-direction toward the engaged position and/or toward the aligned disengaged position.

17. The track system of claim 16, wherein:

when the adjuster pinion is in the aligned disengaged position, the adjuster pinion and the toothed portion are at least partially aligned with one another relative to a Z-direction; and when the adjuster pinion is in the unaligned disengaged position, the adjuster pinion and the toothed portion are not substantially aligned with one another relative to the Z-direction.

18. The track system of claim 17, wherein:

the adjuster pinion is adjustable generally in the Z-direction to engage with and disengage from the toothed portion;

when the adjuster pinion is in the aligned disengaged position, the adjuster pinion is adjustable generally in a Y-direction to move out of Z-direction alignment with the toothed portion to the unaligned disengaged position; and when the adjuster pinion is in the unaligned disengaged position, the adjuster pinion does not substantially restrict removal of the support member from the track assembly generally in the Z-direction.

19. The track system of claim 18, wherein removal of the support member from the track assembly is restricted via the adjuster pinion when the adjuster pinion is in either of the engaged position and the aligned disengaged position.

20. The track system of claim 16, wherein:

the support member includes a slider operatively connected to a lever such that the slider is movable substantially in an X-direction via actuation of the lever;

the adjuster pinion includes a tab that is engaged with the slider; and when the adjuster pinion is in the aligned disengaged position, the adjuster pinion is adjustable generally in a Y-direction to move the adjuster pinion toward the unaligned disengaged position and/or toward the aligned disengaged position via moving the slider generally in the X-direction to cause the tab to engage a guide surface of the slider.

\* \* \* \* \*